US012682696B2

(12) United States Patent
Han

(10) Patent No.: US 12,682,696 B2
(45) Date of Patent: Jul. 14, 2026

(54) ELECTRONIC DEVICE AND METHOD FOR MANAGING EVENT IN VEHICLE COMMUNICATION SYSTEM

(71) Applicant: THINKWARE CORPORATION, Seongnam-si (KR)

(72) Inventor: Taekyu Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 56 days.

(21) Appl. No.: 18/384,227

(22) Filed: Oct. 26, 2023

(65) Prior Publication Data

US 2024/0144741 A1 May 2, 2024

(30) Foreign Application Priority Data

Oct. 27, 2022 (KR) ........................ 10-2022-0140769

(51) Int. Cl.
*G07C 5/02* (2006.01)
*G06F 21/60* (2013.01)
(52) U.S. Cl.
CPC ............. *G07C 5/02* (2013.01); *G06F 21/602* (2013.01)

(58) Field of Classification Search
CPC .......... G08G 1/096725; G08G 1/0112; G08G 1/0116; G08G 1/056; G08G 1/096783
USPC ........................................................ 701/32.6
See application file for complete search history.

(56) References Cited

U.S. PATENT DOCUMENTS

2016/0248594 A1* 8/2016 Barros .................. H04L 9/3263
2022/0319311 A1* 10/2022 Yousaf ................. G08G 1/0112
2024/0233534 A1* 7/2024 Alam .............. G08G 1/096783

* cited by examiner

*Primary Examiner* — Helal A Algahaim
*Assistant Examiner* — John D Holman
(74) *Attorney, Agent, or Firm* — WHDA, LLP

(57) ABSTRACT

In embodiments, a device of a vehicle includes at least one transceiver, memory configured to store instructions, and at least one processor operably coupled to the memory and the at least one transceiver. The at least one processor is, when the instructions are executed, configured to receive an event message related to an event of a source vehicle. The event message includes identification information on a serving road side unit (RSU) of the source vehicle and direction information indicating a driving direction of the source vehicle. The at least one processor is, when the instructions are executed, configured to identify whether the serving RSU of the source vehicle is included in a driving list of the vehicle.

16 Claims, 19 Drawing Sheets

240

560

Internet
(609)

830

631    614    633    613    612    611    635

621    622    623    624

651    653    655

DETECT OCCURRENCE OF EVENT ~1101

GENERATE EVENT INFORMATION INCLUDING SERVING RSU IDENTIFICATION INFORMATION AND DRIVING DIRECTION ~1103

TRANSMIT EVENT MESSAGE INCLUDING EVENT INFORMATION ~1105

RECEIVE EVENT MESSAGE FROM RSU ~1201

UPDATE AUTONOMOUS DRIVING INFORMATION
ACCORDING TO OCCURRENCE OF EVENT ~1203

GENERATE AUTONOMOUS DRIVING DATA ~1205

TRANSMIT AUTONOMOUS DRIVING DATA TO EACH RSU ~1207

1400

ELECTRONIC DEVICE AND METHOD FOR MANAGING EVENT IN VEHICLE COMMUNICATION SYSTEM

CROSS-REFERENCE TO RELATED APPLICATION(S)

This application is based on and claims priority under 35 U.S.C. § 119 to Korean Patent Application No. 10-2022-0140769, filed on Oct. 27, 2022, in the Korean Intellectual Property Office, the disclosure of which is incorporated by reference herein in its entirety.

BACKGROUND

Technical Field

The present disclosure relates to a vehicle communication system, and more specifically, to an electronic device and method for managing an event in the vehicle communication system.

Description of Related Art

An advanced driver assistance system (ADAS) is being developed, such as preventing a traffic accident of a driving vehicle in advance and promoting efficiency of traffic flow. In this case, vehicle-to-everything (V2X) may be used as a vehicle communication system. As a representative example of the V2X, vehicular-to-vehicular (V2V) communication and vehicular-to-infrastructure (V2I) communication may be used. A vehicle that supports V2V and V2I communication may send each other a collision warning or the presence of a forward accident between another vehicle (a surrounding vehicle) that supports V2X communication. A management device such as a road side unit (RSU) may control traffic flow by notifying vehicles of real-time traffic conditions or controlling signal waiting times.

SUMMARY

In embodiments, a device of a vehicle may comprise at least one transceiver, memory configured to store instructions, and at least one processor operably coupled to the memory and the at least one transceiver. The at least one processor may be, when the instructions are executed, configured to receive an event message related to an event of a source vehicle. The event message may include identification information on a serving road side unit (RSU) of the source vehicle and direction information indicating a driving direction of the source vehicle. The at least one processor may be, when the instructions are executed, configured to identify whether the serving RSU of the source vehicle is included in a driving list of the vehicle. The at least one processor may be, when the instructions are executed, configured to identify whether the driving direction of the source vehicle matches a driving direction of the vehicle. The at least one processor may be, when the instructions are executed, configured to, upon identifying that the driving direction of the source vehicle matches the driving direction of the vehicle and the serving RSU of the source vehicle is included in the driving list of the vehicle, perform driving according to the event message. The at least one processor may be, when the instructions are executed, configured to, upon identifying that the driving direction of the source vehicle does not match the driving direction of the vehicle or the serving RSU of the source vehicle is not included in the driving list of the vehicle, perform driving without the event message.

In embodiments, a device performed by a road side unit (RSU), the device may comprise at least one transceiver, memory configured to store instructions, and at least one processor operably coupled to the memory and the at least one transceiver. The at least one processor may be, when the instructions are executed, configured to receive an event message related to an event in the vehicle from a vehicle serviced by the RSU. The event message may include identification information of the vehicle and direction information indicating a driving direction of the vehicle. The at least one processor may be, when the instructions are executed, configured to identify a driving path of the vehicle based on the identification information of the vehicle. The at least one processor may be, when the instructions are executed, configured to identify at least one RSU located in a direction opposite to the driving direction of the vehicle from the RSU among one or more RSUs included in the driving path of the vehicle. The at least one processor may be, when the instructions are executed, configured to transmit the event message to each of the identified at least one RSU.

In embodiments, a method performed by a vehicle, the method may comprise receiving an event message related to an event of a source vehicle. The event message may include identification information on a serving road side unit (RSU) of the source vehicle and direction information indicating a driving direction of the source vehicle. The method may include identifying whether the serving RSU of the source vehicle is included in a driving list of the vehicle. The method may include identifying whether the driving direction of the source vehicle matches a driving direction of the vehicle. The method may include, upon identifying that the driving direction of the source vehicle matches the driving direction of the vehicle and the serving RSU of the source vehicle is included in the driving list of the vehicle, performing driving according to the event message. The method may include, upon identifying that the driving direction of the source vehicle does not match the driving direction of the vehicle or the serving RSU of the source vehicle is not included in the driving list of the vehicle, performing driving without the event message.

In embodiments, a method performed by a road side unit (RSU), may comprise receiving an event message related to an event in the vehicle from a vehicle serviced by the RSU. The event message may include identification information of the vehicle and direction information indicating a driving direction of the vehicle. The method may comprise identifying a driving path of the vehicle based on the identification information of the vehicle. The method may comprise identifying at least one RSU located in a direction opposite to the driving direction of the vehicle from the RSU among one or more RSUs included in the driving path of the vehicle. The method may comprise transmitting the event message to each of the identified at least one RSU.

DETAILED DESCRIPTION

Figure 1:
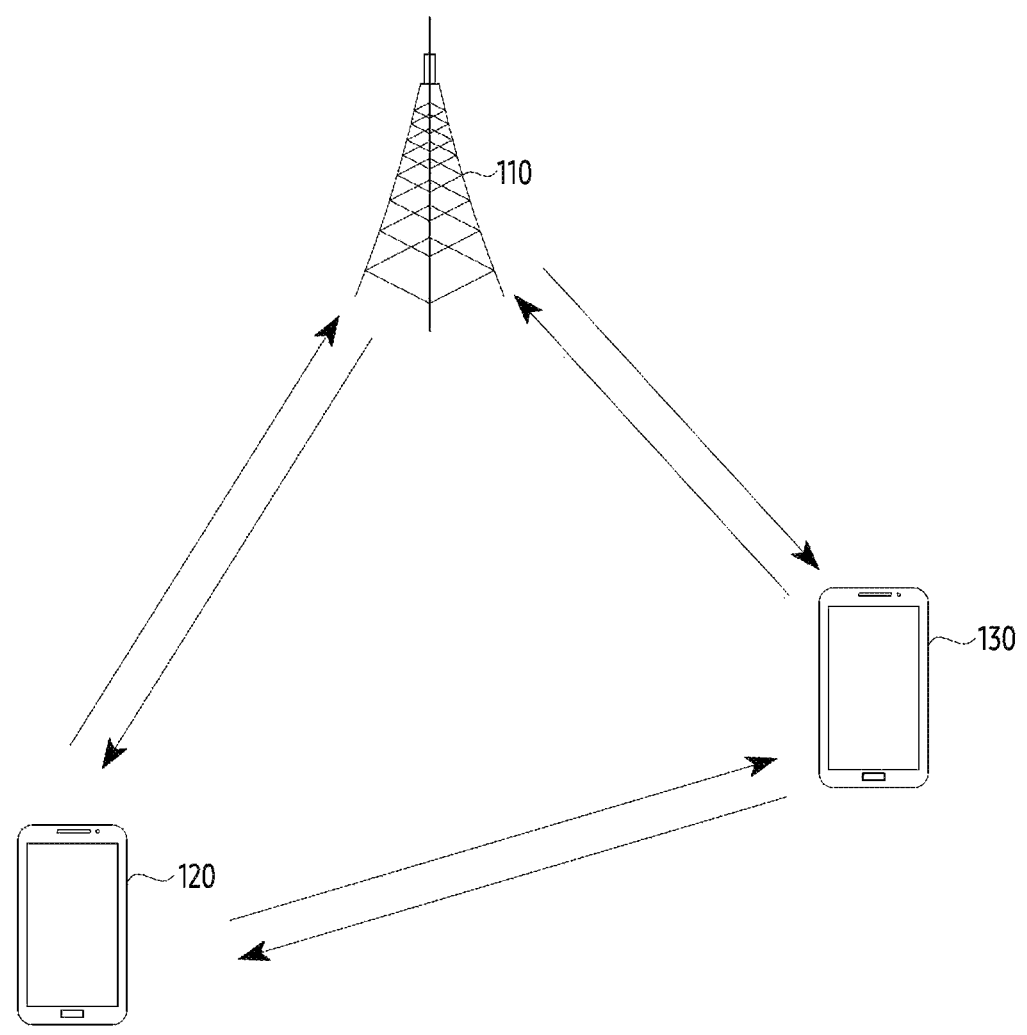
FIG. 1 illustrates a wireless communication system according to embodiments.

Terms used in the present disclosure are used only to describe a specific embodiment, and may not be intended to limit the scope of another embodiment. A singular expression may include a plural expression unless it is clearly meant differently in the context. The terms used herein, including a technical or scientific term, may have the same meaning as generally understood by a person having ordinary knowledge in the technical field described in the present disclosure. Terms defined in a general dictionary among the terms used in the present disclosure may be interpreted with the same or similar meaning as a contextual meaning of related technology, and unless clearly defined in the present disclosure, it is not interpreted in an ideal or excessively formal meaning. In some cases, even terms defined in the present disclosure cannot be interpreted to exclude embodiments of the present disclosure.

In various embodiments of the present disclosure described below, a hardware approach is described as an example. However, since the various embodiments of the present disclosure include technology that use both hardware and software, the various embodiments of the present disclosure do not exclude a software-based approach.

A terms referring to a signal (e.g., signal, information, message, signaling), a term referring to a data type (e.g., list, set, subset), a term for the operational state (e.g., step, operation, procedure), a term referring to data (e.g., packet, user stream, information, bit, symbol, codeword), a term referring to a resource (e.g., symbol, slot, subframe, radio frame, subcarrier, resource element (RE), resource block (RB), bandwidth part (BWP), opportunity), a term referring to a channel, a term referring to network entities, a term referring to a component of a device, and the like used in the following description are illustrated for convenience of description. Accordingly, the present disclosure is not limited to terms described below, and another term having an equivalent technical meaning may be used.

In addition, in the present disclosure, in order to determine whether a specific condition is satisfied or fulfilled, an expression of more than or less than may be used, but this is only a description for expressing an example, and does not exclude description of more than or equal to or less than or equal to. A condition described as 'more than or equal to' may be replaced with ' more than', a condition described as 'less than or equal to' may be replaced with 'less than', and a condition described as 'more than or equal to and less than' may be replaced with 'more than and less than or equal to'. In addition, hereinafter, 'A' to 'B' means at least one of elements from A (including A) and to B (including B).

The present disclosure describes various embodiments by using terms used in some communication standards (e.g., 3rd Generation Partnership Project (3GPP), European Telecommunications Standards Institute (ETSI), extensible radio access network (xRAN), and open-radio access network (O-RAN), but this is only an example for description. Various embodiments of the present disclosure may be easily modified and applied in other communication systems. In addition, in describing communication between vehicles in the present disclosure, terms in 3GPP-based cellular (C)-V2X is described as an example, but not only C-V2X, Wi-Fi-based dedicated short range communication (DSRC) and a communication scheme defined by another organization (e.g., 5G automotive association (5GAA)) or a separate organization may be used for embodiments of the present disclosure.

FIG. 1 illustrates a wireless communication system according to embodiments of the present disclosure. FIG. 1 exemplifies a base station 110, a terminal 120, and a terminal 130 as some of the nodes that use a wireless channel in a wireless communication system. Although FIG. 1 illustrates only one base station, another base station which is the same as or similar to the base station 110 may be further included.

The base station 110 is a network infrastructure that provides wireless access to terminals 120 and 130. The base station 110 has coverage defined as a certain geographic area based on a distance in which a signal may be transmitted. The base station 110 may be referred to as 'access point (AP)', 'eNodeB (eNB)', '5th generation node (5G node)', 'next generation nodeB (gNB)', 'wireless point', 'transmission/reception point (TRP)', or other terms having the same technical meaning in addition to the base station.

Each of the terminals 120 and 130 is a device used by a user and performs communication with the base station 110 through the wireless channel. A link from the base station 110 toward the terminal 120 or the terminal 130 is referred to as downlink (DL), a link from the terminal 120 or the terminal 130 toward the base station 110 is referred to as uplink (UL). In addition, the terminal 120 and the terminal 130 may perform communication with each other through the wireless channel. In this case, the link between the terminal 120 and the terminal 130 is referred to as a sidelink, and the sidelink may be used interchangeably with the PC5 interface. In some cases, at least one of the terminal 120 and the terminal 130 may be operated without user's involvement. In other words, at least one of the terminal 120 and the terminal 130 is a device that performs machine type communication (MTC) and may not be carried by the user. Each of the terminal 120 and the terminal 130 may be referred to as 'user equipment (UE)', 'mobile station', 'subscriber station', 'remote terminal', 'wireless terminal', or 'user device' or other terms having the same technical meaning in addition to the terminal.

Figure 2:
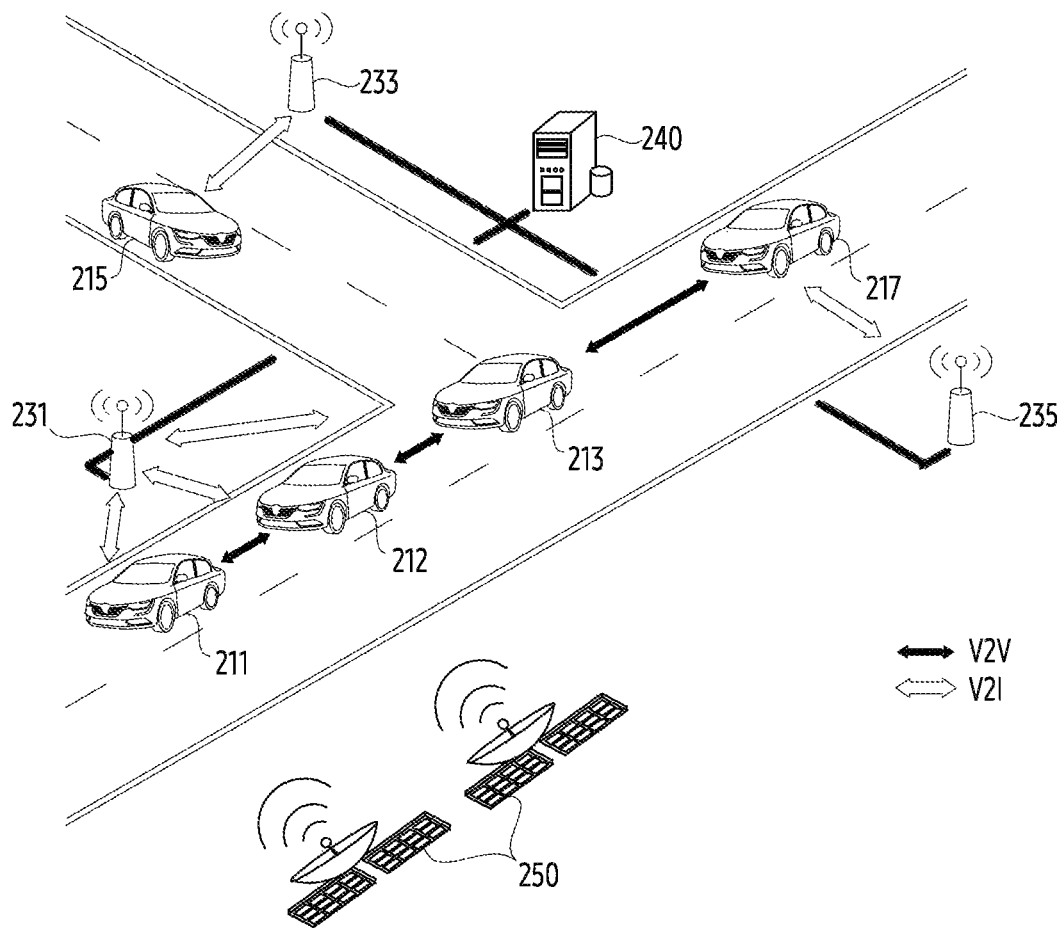
FIG. 2 illustrates an example of a traffic environment according to embodiments.

FIG. 2 illustrates an example of a traffic environment according to embodiments. Vehicles on the road may perform communication. Vehicles performing communication may be viewed as terminals 120 and 130 of FIG. 1, and communication between the terminal 120 and the terminal 130 may be viewed as vehicular-to-vehicular (V2V) communication. In other words, the terminals 120 and 130 may mean a vehicle that supports vehicular-to-vehicular communication, a vehicle that supports vehicular-to-pedestrian (V2P) communication, a pedestrian's handset (e.g., a smartphone), a vehicle that supports a vehicular-to-network (V2N), or a vehicle that supports vehicular-to-infrastructure (V2I) communication. In addition, in the present disclosure, the terminal may mean an road side unit (RSU) equipped with terminal functions, an RSU equipped with the functions of the base station 110, or an RSU equipped with part of the function of the base station 110 and part of the function of the terminal 120.

Referring to FIG. 2, vehicles (e.g., a vehicle 211, a vehicle 212, a vehicle 213, a vehicle 215, and a vehicle 217) may be driving on the road. In order to support communication with a vehicle which is driving, a plurality of RSUs (e.g., a RSU 231, a RSU 233, and a RSU 235) may be located across the road. Each RSU may perform the base station or some functions of the base station instead. For example, each RSU may allocate resources to individual vehicles and perform communication with the vehicle to provide a service (e.g., an autonomous driving service) to each vehicle. For example, the RSU 231 may perform communication with the vehicle 211, the vehicle 212, and the vehicle 213. The RSU 233 may perform communication with the vehicle 215. The RSU 235 may perform communication with the vehicle 217. Meanwhile, in addition to the RSU of the terrestrial network, the vehicle may also perform communication with a network entity of a non-terrestrial network, such as a GNSS satellite 250.

The RSU controller 240 may control a plurality of RSUs. The RSU controller 240 may allocate each RSU ID to each of the RSUs. The RSU controller 240 may generate a neighboring RSU list including RSU IDs of neighboring RSUs of each RSU. The RSU controller 240 may be connected to each RSU. For example, the RSU controller 240 may be connected to the first RSU 231. The RSU controller 240 may be connected to the second RSU 233. The RSU controller 240 may be connected to the third RSU 235.

The vehicle may access the network through the RSU. However, the vehicle may also perform communication directly with other vehicles as well as the network entity such as the base station. The vehicle and the vehicle may perform communication with each other. In other words, not only the V2I but also the V2V is possible, and the transmitting vehicle may transmit a message to at least one other vehicle. For example, the transmitting vehicle may transmit the message to the at least one other vehicle through the resource allocated from the RSU. For another example, the transmitting vehicle may transmit the message to the at least one other vehicle through the resource within a pre-configured resource pool.

Figure 3:
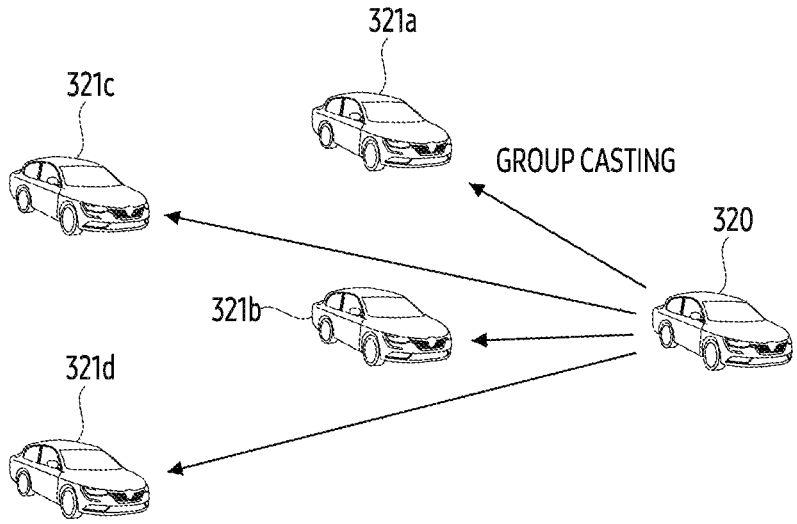
FIG. 3 illustrates an example of vehicle communication of groupcast method according to an embodiment.

FIG. 3 illustrates an example of vehicle communication of groupcast method according to an embodiment. Hereinafter, each vehicle exemplifies the vehicles 211, 212, and 213 of FIG. 2.

Referring to FIG. 3, the one-to-many transmission method may be referred to as groupcast or multicast. A transmitting vehicle 320, a first vehicle 321a, a second vehicle 321b, a third vehicle 321c, and a fourth vehicle 321d may form one group, and vehicles within the group may perform groupcast communication. The vehicles may perform groupcast communication within the group they belong to and may perform unicast, groupcast, or broadcast communication with at least one other vehicle belonging to different groups. Meanwhile, unlike FIG. 3, sidelink vehicles may perform the broadcast communication. The broadcast communication means a method in which all surrounding sidelink vehicles receive data and control information transmitted through the sidelink by the sidelink transmitting vehicle. For example, in FIG. 3, in case that another vehicle is driving near the transmitting vehicle 320 and the other vehicle is not designated as a group, the other vehicle cannot receive data and control information according to the groupcast communication of the transmitting vehicle 320. However, even if the other vehicle is not designated as the group, the other vehicle may receive data and control information according to the broadcast communication of the transmitting vehicle 320.

Figure 4:
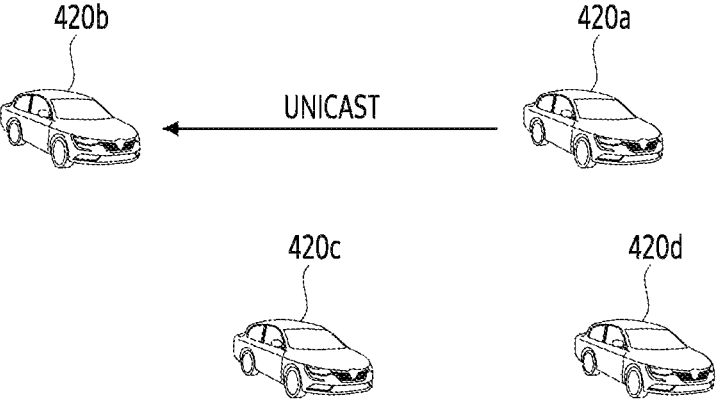
FIG. 4 illustrates an example of vehicle communication of unicast method according to an embodiment.

FIG. 4 illustrates an example of vehicle communication of unicast method according to an embodiment.

Referring to FIG. 4, the one-to-one transmission method may be referred to as unicast. The one-to-many transmission method may be referred to as groupcast or multicast. A transmitting vehicle 420a may designate the first vehicle 420b among the first vehicle 420b, the second vehicle 420c, and the third vehicle 420d as a target to receive a message, and may transmit the message for the first vehicle 420b. The transmitting vehicle 420a may transmit the message to the first vehicle 420b in a unicast method through radio access technology (e.g., LTE, NR).

In case of NR sidelink, unlike in LTE sidelink, support for a transmission type in which a vehicle transmits data only to one specific vehicle through the unicast and a transmission type in which a vehicle transmits data to a plurality of specific vehicles through the groupcast may be considered. For example, in case of considering a service scenario such as platooning, which is a technology that connects two or more vehicles to one network and moves in a group form, these unicast and groupcast technologies may be used usefully. Specifically, the unicast communication may be used for a purpose of controlling one specific vehicle by the leader vehicle of a group connected by platooning, the groupcast communication may be used for a purpose of simultaneously controlling a group configured with a plurality of specific vehicles.

For example, in a sidelink system such as V2X, V2V, and V2I, resource allocation may be divided into two modes as follows.

(1) Mode 1 Resource Allocation

Mode 1 is a method based on scheduled resource allocation by the RSU (or base station). More specifically, in the mode 1 resource allocation, the RSU may allocate resources used for sidelink transmission to Radio Resource Control (RRC)-connected vehicles according to a dedicated scheduling method. Since the RSU may manage the resources of the sidelink, scheduled resource allocation is advantageous for interference management and management of resource pools (e.g., dynamic allocation and/or semi-persistent transmission). In case that the RRC connected mode vehicle has data to transmit to other vehicle(s), the vehicle may transmit information notifying the RSU that there is data to transmit data to the other vehicle(s) by using an RRC message or MAC control element. For example, the RRC message notifying the existence of data may be a sidelink terminal information (SidelinkUEInformation) or terminal assistance information (UEAssistanceInformation) message. For example, the MAC control element notifying the existence of data may be a buffer status report (BSR) MAC control element for sidelink communication. Also, a scheduling request (SR) may be used to notify the existence of data. The buffer status report includes at least one of an indicator notifying that it is the BSR and information on the size of data buffered for the sidelink communication. Since the RSU schedules resources to the transmitting vehicle when applying mode 1, the mode 1 may be applied only in case that the transmitting vehicle is within the coverage of the RSU.

(2) Mode 2 resource allocation

Mode 2 is a method based on UE autonomous resource selection, in which the sidelink transmitting vehicle selects resources. Specifically, according to the mode 2, the RSU provides the sidelink transmission/reception resource pool for the sidelink to the vehicle as system information or RRC messages (e.g., RRCReconfiguration message, PC-5 RRC message), the transmitting vehicle selects resource pools and resources according to established rules. Since the RSU provides configuration information for the sidelink resource pool, the mode 2 may be used in case that the vehicle is within the coverage of the RSU. In case that the vehicle exists outside the coverage of the RSU, the vehicle may perform operations according to the mode 2 in a pre-configured resource pool. For example, as an autonomous resource selection method for the vehicle, zone mapping, sensing-based resource selection, random selection, and the like may be used.

(3) Others

Additionally, even if located within the coverage of the RSU, there may be cases where resource allocation or resource selection cannot be performed in scheduled resource allocation or vehicle autonomous resource selection mode. In this case, the vehicle may perform sidelink communication through a preconfigured resource pool.

Currently, in order to implement autonomous vehicles, many companies and developers are striving to enable the vehicle to perform all tasks on its own in the same way that humans perform while driving the vehicle. These tasks may be largely divided into a Perception step, which recognizes the vehicle's surrounding environment through various sensors, a Decision-making step, which determines how to control the vehicle by using various information recognized through sensors, and a Control step, which controls the operation of the vehicle according to the determined Decision-making.

In the perception step, the vehicle collects data from the surrounding environment through radar, lidar, cameras, ultrasonic sensors, and the like, and perceives vehicles, pedestrians, roads, lanes, obstacles, and the like, by using this. In the decision step, the vehicle perceives the driving situation based on the results perceived in the previous step, searches the driving path, and determines optimal driving conditions (path, speed, and the like) by determining vehicle/pedestrian collision prevention and obstacle avoidance. In the control step, the vehicle generates commands to control the vehicle's drive system and steering system to control vehicle driving and movement based on perception and decision results. However, in order to implement more complete autonomous driving, in the perception step it is desirable to additionally utilize information received from other vehicles or road infrastructure through a wireless communication device mounted on the vehicle rather than recognizing the external environment of the vehicle by using only sensors mounted on the vehicle.

Various technologies related to wireless communication of such vehicles have been studied for a long time, and a representative technology among these technologies is the intelligent transport system (ITS). Recently, Vehicular Ad hoc Network (VANET) has been attracting attention as one of the technologies for realizing ITS. The VANET is a network technology that provides V2V and V2I communication by using wireless communication technology. A variety of services to drivers, including helping them drive safely and efficiently, by delivering various information to the vehicle, such as the speed or location of the surrounding vehicle and traffic information on the road in which it is driving, by using the VANET are provided. In particular, it is important to deliver an emergency message needed by drivers, such as traffic accident information, secondary accident prevention, and efficient traffic flow management.

In order to deliver various information to all drivers by using the VANET, a broadcast routing technique is used. The broadcast routing technique is the simplest method used for information delivery, and when sending a specific message, transmits a message to all nearby vehicles, regardless of the receiver's ID and whether the message is received or not, and the vehicle that receives the corresponding message also retransmits the corresponding message to all nearby vehicles, to deliver the corresponding message to all vehicles on the network. As such, the broadcast routing method is the simplest way to deliver information to all vehicles, but since it generates enormous network traffic, it causes a network congestion problem called a broadcast storm in urban areas with high vehicle density. In addition, the broadcast routing method must set Time to Live (TTL) to limit the message delivery range, but since messages are delivered by using the wireless network, there is also the problem that the TTL cannot be set accurately.

In order to solve this broadcast storm problem, research is being conducted on various methods such as probability-based, region-based, and clustering-based algorithms. However, in case of the probability-based algorithms, vehicles for retransmission are selected probabilistically, so in the worst case, retransmission may occur in many vehicles or no retransmission may occur. In addition, in case of the clustering-based algorithms, frequent retransmission may occur in case that the cluster size is not large enough.

The following application technologies are being researched to satisfy the previously mentioned VANET security requirements. Each vehicle existing in the vehicle network has a built-in tamper-proof device (TPD) that is impossible to be changed. In the TPD, a vehicle's unique electronic number exists, and secret information about the vehicle user is stored. Each vehicle performs user authentication through the TPD. Digital Signature is a message authentication technique used to independently authenticate the message and provide a non-repudiation function for the user who sent the message. Each message includes a signature signed with the user's private key, and the receiver of the message confirms that the message was the message sent from a legitimate user by verifying the signed value by using the user's public key.

In addition, institute of electrical and electronics Engineers (IEEE) 1609.2 is a standard related to wireless access in vehicular environments (WAVE), which is a wireless communication standard in automotive environments, and is studying security standards that vehicles must comply with when communicating wirelessly with other vehicles or external systems. In case that wireless communication traffic in the vehicle increases rapidly in the future, the number of attacks such as eavesdropping, spoofing, and packet reuse that occur in a general network environment will also increase, which will clearly have a very bad impact on the safety of the vehicle. Therefore, IEEE 1609.2 standardizes the VANET security structure based on Public Key Infrastructure (PKI). Vehicular PKI (VPK) is a technology that applies Internet-based PKI to the vehicle, and the TPD includes certificates provided by authorized agencies. The vehicle uses the certificates provided by authorized agencies, to authenticate itself and its counterpart in vehicular-to-vehicular (V2V) and vehicular-to-infrastructure (V2I) communication. However, in the PKI structure, since vehicles move at high speed, it is difficult for vehicles to respond quickly in services that require rapid response such as vehicle emergency messages and traffic situation messages due to the procedure for validating the certificate of the vehicle sending the message. Anonymous keys are used for a purpose for protecting the privacy of vehicles using the network in a VANET environment, and have a purpose for preventing personal information leakage through Anonymous Key in the VANET.

As described above, various methods are being studied to quickly transmit an event message that may occur in various situations in the VANET environment to other vehicles or infrastructure while maintaining high security. However, in general, in order to maintain high security, complex cryptographic algorithms and/or various authentication procedures to verify integrity should be additionally performed, and this still acts as an obstacle to quickly transmitting and receiving data for the safe operation of devices that move at high speeds, such as vehicles. Therefore, the following will describe embodiments for quickly transmitting data generated in a vehicle in which an event occurs to another vehicle while maintaining high security. First, messages and related procedures required for a vehicle performing an autonomous driving service are described in FIG. 5.

(1) RSU Unit Encryption

Figure 5:
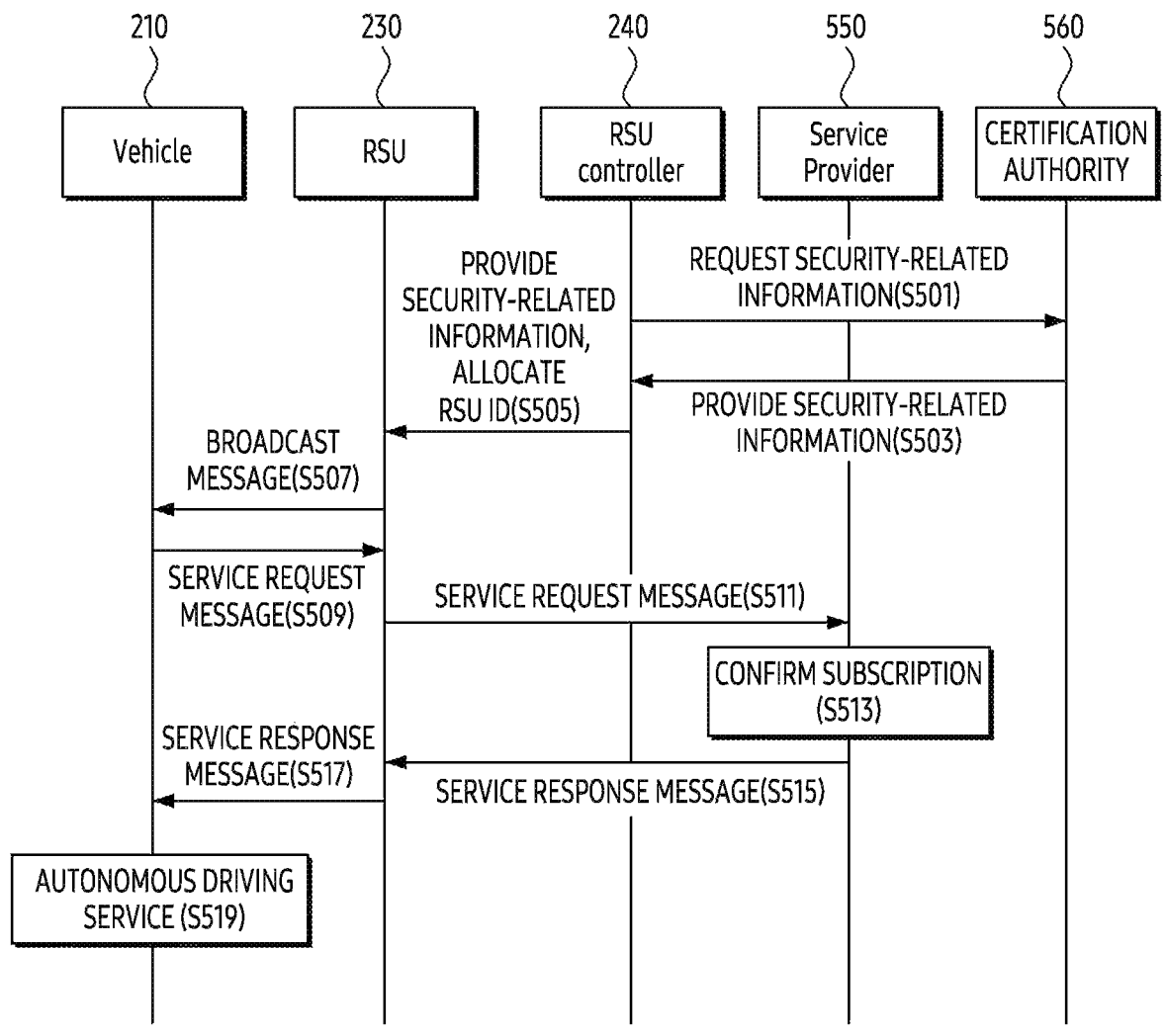
FIG. 5 illustrates an example of a procedure of establishing an autonomous driving service through a road side unit (RSU) according to an embodiment.

FIG. 5 illustrates an example of a procedure of establishing an autonomous driving service through a road side unit (RSU) according to an embodiment. A vehicle 210 that receives the autonomous driving service exemplifies a vehicle 211, a vehicle 212, a vehicle 213, a vehicle 215, or a vehicle 217 in FIG. 2. The same reference numerals may be used for corresponding descriptions.

Referring to FIG. 5, in operation S501, a RSU controller 240 may transmit a request message for requesting security-related information to a certification authority server 560.

The certification authority server 560, as an organization that manages or supervises a plurality of RSUs, may generate and manage keys and certificates for each RSU. In addition, the certification authority server 560 may issue a certificate for the vehicle or may manage the issued certificate. The RSU controller 240 may request the certification authority server 560 for an Encryption key/Decryption key to be used within the coverage of each RSU.

In operation S503, the certification authority server 560 may transmit a response message including the security-related information. The certification authority server 560 may generate the security-related information for the RSU controller 240 in response to the request message. According to an embodiment, the security-related information may include encryption-related information to be applied to messages between the RSU and the vehicle. For example, the security-related information may include at least one of the encryption method, encryption version (which may be a version of the encryption algorithm), and key to be used (e.g., symmetric key, or public key).

In operation S505, the RSU controller 240 may provide a configuration message including an RSU ID and the security-related information to each RSU (e.g., a RSU 230). The RSU controller 240 may be connected to one or more RSUs. According to an embodiment, the RSU controller 240 may configure the security-related information required for individual RSUs of the one or more RSUs, based on the security-related information obtained from the certification authority server 560. The RSU controller 240 may allocate the Encryption key/Decryption key to be used to each RSU. For example, the RSU controller 240 may configure the security-related information to be used in the RSU 230. According to an embodiment, the RSU controller 240 may allocate the RSU IDs for the one or more RSUs. The configuration message may include information on the RSU ID allocated to the corresponding RSU.

In operation S507, the RSU 230 may transmit a broadcast message to the vehicle 210. The RSU 230 may generate the broadcast message based on the security-related information and the RSU ID. The RSU 230 may transmit the broadcast message to vehicles (e.g., the vehicle 210) within the coverage of the RSU 230. The vehicle 210 may receive the broadcast message. For example, the broadcast message may have a message format as shown in the following table.

TABLE 1

| Field | Description | Note |
|---|---|---|
| Message Type | Broadcast | Indicates that this is a broadcast message transmitted through R2V communication. |
| RSU ID | ID of the RSU transmitting the Broadcast message | Serving RSU ID |
| RSU location information | Location information of RSU | |
| Neighbor RSU's information | List information of adjacent RSUs | |
| Encryption Policy | Password policy information | |
| Encryption scheme | symmetric-key schemeasymmetric-key scheme | Information indicating whether the applied encryption method is a symmetric key method or an asymmetric key method. |

TABLE 1-continued

| Field | Description | Note |
|---|---|---|
| Encryption algorithm version | Encryption algorithm version Information | Information indicating the encryption version |
| Encryption Key/Decryption Key | Encryption Key information/Decryption Key information | Indicates key information used according to the applied encryption method (For example, in case that an asymmetric key method is used, the public key is used for encryption or decryption, and in case that a symmetric key method is used, the symmetric key is used for encryption/decryption. |
| Key information | Key issuance date, key validity date, certification authority information, key version information | |

The symmetric key method means an algorithm in which the same key is used for encryption and decryption. One symmetric key may be used for both encryption and decryption. For example, as an algorithm for the symmetric key method, data encryption standard (DES), advanced encryption standard (AES), and SEED may be used. The asymmetric key method means an algorithm that performs the encryption and/or decryption through the public key and the private key. For example, the public key may be used for the encryption, but the private key may be used for the decryption. For another example, the private key may be used for the encryption, but the public key may be used for the decryption. For example, as an algorithm for the symmetric key method, Rivest, Shamir and Adleman (RSA) and elliptic curve cryptosystem (ECC) may be used.

According to an embodiment, the vehicle 210 may identify the serving RSU, in other words, the RSU 230, corresponding to the coverage into which the vehicle 210 has entered by receiving the broadcast message. The vehicle 210 may identify the encryption method in the RSU 230 based on the broadcast message. For example, the vehicle 210 may identify the encryption method in the RSU 230. For example, the vehicle 210 may decrypt a message encrypted by the public key or the symmetric key of the RSU 230. Meanwhile, the broadcast message exemplified in Table 1 is exemplary, and embodiments of the present disclosure are not limited thereto. In case that the encryption method to be used for communication between the vehicle 210 and the RSU 230 is predetermined in the communication standard, at least one of the elements of the broadcast message (e.g., an encryption scheme) may be omitted.

In operation S509, the vehicle 210 may transmit a service request message to the RSU 230. The vehicle 210 entering the RSU 230 may initiate the autonomous driving service after receiving the broadcast message. The vehicle 210 may generate the service request message to initiate the autonomous driving service. For example, the service request message may have a message format as shown in the following table.

TABLE 2

| Field | Description | Note |
|---|---|---|
| Service Request ID | Service Request ID | Information to identify the autonomous driving service requested by the corresponding vehicle (use for distinguishing from autonomous driving service requests received from other vehicles) |
| Vehicle ID | Vehicle Identifier | Unique information allocated to identify vehicles (VIN, SIM(subscriber identification module), vehicle IMSI (international mobile subscriber identity) and the like)// May be allocated by vehicle manufacturer or wireless carrier |
| User ID | User Identifier | User ID that requested the autonomous driving service (user ID that subscribed to the autonomous driving service) |
| Departure location | Autonomous driving service start point | Autonomous driving start location (location information of vehicle, electronic devices) |
| Destination location | Autonomous driving service termination point (destination) | Autonomous driving termination location (destination information entered by the user) |

TABLE 2-continued

| Field | Description | Note |
|---|---|---|
| Serving RSU ID | Serving RSU ID | RSU ID of the coverage where the vehicle is currently located |
| Map data version | Map data version | Map data version information current ly stored in the vehicle |
| Autonomous driving software version | Autonomous driving software version | Autonomous driving software version information currently stored in the vehicle |

Meanwhile, the service request message exemplified in Table 2 is exemplary, and embodiments of the present disclosure are not limited thereto. According to an embodiment, the service request message may further include additional information (e.g., autonomous driving service level and vehicle capability). According to another embodiment, at least one of elements (e.g., the autonomous driving service start point) of the service request message may be omitted.

In operation S511, the RSU 230 may transmit the service request message to a service provider server 550.

In operation S513, the service provider server 550 may confirm subscription information. The service provider server 550 may identify whether the vehicle 210 has subscribed to the autonomous driving service by checking the user ID ('User ID') and 'Vehicle ID' of the service request 210 may identify that it has reached the RSU in the driving plan information through the RSU ID of the broadcast message of the new RSU.

According to an embodiment, the service provider server 550 may generate encryption information for each RSU in the list. In order to collect and process information generated from an area expected to pass through, in other words, the RSU, the vehicle 210 needs to know pre-encryption information on the corresponding RSU. Accordingly, the service provider server 550 may generate encryption information for each RSU about the expected path of the vehicle 210 and may include the generated encryption information in the service response message. For example, the service response message may have a message format as shown in the following table.

TABLE 3

| Field | Description | Note |
|---|---|---|
| Service request response | Service Request ID | Service request message ID corresponding to the Response |
| Route plan information | Start Point, Destination Point, Global Path Planning information(Route Number, Cost vales for each calculated route) | Route plan information calculated from the Start Point to the Destination Point) (hereinafter, driving plan information), Cost value for each of the plural number of routes calculated from the Start Point to the Destination Point |
| Neighbor RSU List | RSU 12, RSU 13, RSU 34, RSU 35 etc. | RSU List information existing on the calculated route (e.g., a list of RSU IDs allocated by the RSU controller 240) |
| Pre-EncryptionKey | RSU 12: 04 CE D7 61 49 49 FD; RSU 13: 11 70 4E 49 16 61 FC; RSU 34: FA 7F BA 6F 0C 05 53; RSU 35: 1B 86 BC A3 C5 BC D8. Etc. | N pre-encryption keys allocated to each RSU which is existing on the route (here, N is an integer greater than or equal to 1) | message. In case that the vehicle 210 subscribes to the autonomous driving service, the service provider server 550 may store information on the service user.

In operation S515, the service provider server 550 may transmit a service response message to the RSU 230. The service provider server 550 may generate driving plan information for the vehicle 210 based on the service request message for the vehicle 210 received from the RSU 230.

According to an embodiment, the service provider server 550 may obtain a list of one or more RSUs adjacent to or located on the expected path based on driving plan information. For example, the list may include at least one of the RSU IDs allocated by the RSU controller 240. Whenever the vehicle 210 enters a new RSU along the path, the vehicle In operation S517, the RSU 230 may transmit the service response message to the vehicle 210. The RSU 230 may transmit the service response message received from the service provider server 550 to the vehicle 210.

In operation S519, the vehicle 210 may perform the autonomous driving service. The vehicle 210 may perform the autonomous driving service based on the service response message. The vehicle 210 may perform the autonomous driving service based on the expected path of the driving plan information. The vehicle 210 may move along each RSU present on the path.

According to an embodiment, a sender transmitting a message within the coverage of the RSU may transmit the message based on the public key or symmetric key of the RSU. For example, the RSU 230 may encrypt a message (e.g., the service response message in operation S517 or the event message in operation S711 of FIG. 7) based on the public key or symmetric key of the RSU. The receiver cannot decrypt the message without the symmetric key or the private key corresponding to the public key of the RSU. For example, a vehicle that does not have the private key corresponding to the public key of the RSU or a vehicle that does not have the symmetric key cannot decrypt the message.

According to an embodiment, the message transmitted from the vehicle may be encrypted based on the private key or the symmetric key of the vehicle. In case that a symmetric key algorithm is used, the sender may transmit the message (e.g., the event message of operation S701 of FIG. 7) by using the symmetric key of the RSU. The receiver may obtain the symmetric key through the broadcast message in operation S501 or the service response message in operation S515. The receiver may decrypt the message. Meanwhile, in case that an asymmetric key algorithm is used, the private key of the vehicle and the public key of the RSU serving the vehicle may be grouped for the asymmetric key algorithm. The private key may be allocated to each vehicle in the RSU, and the public key may be allocated to the RSU. Each private key and public key may be used for encryption/ decryption or decryption/encryption, respectively. The sender may transmit the message (e.g., the event message of operation S701 of FIG. 7) by using a private key corresponding to the public key of the RSU. The receiver must know the public key of the RSU to decrypt the message. If the receiver is a vehicle that knows the public key of the RSU, the receiver may decrypt the event message even if it is in the coverage of an RSU that is different from the serving RSU of the vehicle that sent the event message. To this end, the service response message for autonomous driving may provide encryption information (e.g., pre-encryption key) on the RSU on the driving path to the vehicle.

In FIG. 5, a situation receiving the broadcast message and transmitting the service request message is described, but embodiments of the present disclosure are not limited thereto. The vehicle 210 does not transmit the service request message every time it newly enters the coverage of the RSU. The vehicle 210 may transmit the service request message through the serving RSU periodically or according to the occurrence of a specific event. In other words, when the vehicle 210 enters another RSU, if the vehicle 210 already has the driving plan information, the service request message may not be transmitted after receiving the broadcast message.

In FIG. 5, for the autonomous driving service, an example in which the vehicle 210 enters the new RSU and identifies RSUs on the expected path through the service provider server is described. The autonomous driving service may be used to provide adaptive driving information by detecting events in advance at an autonomous driving server (e.g., the service provider server 550) instead of manually setting the path. In other words, even if an unexpected event occurs, the autonomous driving server may provide a changed driving path to the vehicle by collecting and analyzing information on the event. Hereinafter, a situation in which the event occurs during driving is described in FIG. 6.

(2) Event Message

Figure 6:
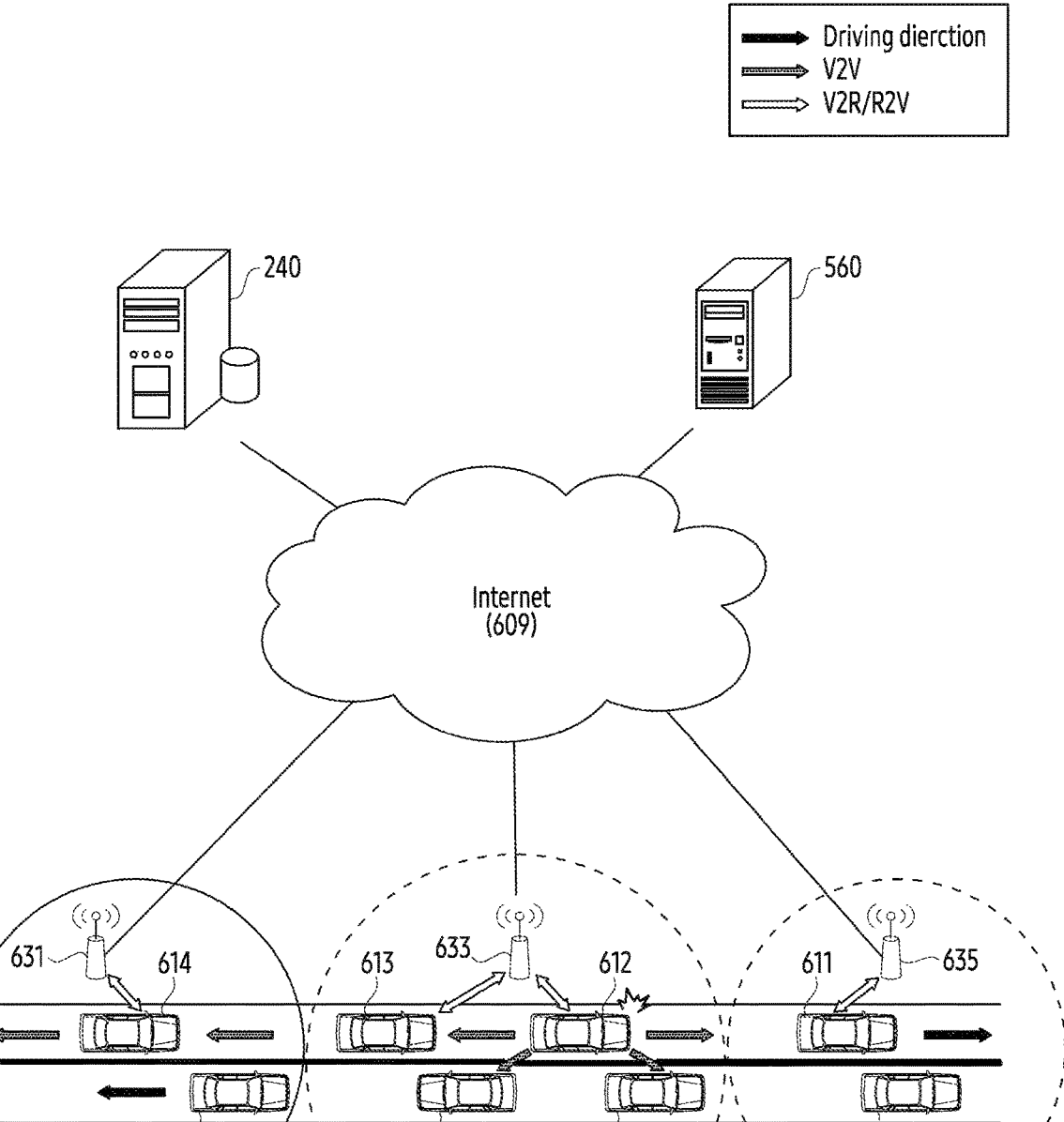
FIG. 6 illustrates an example of an autonomous driving service based on an event according to an embodiment.

FIG. 6 illustrates an example of an autonomous driving service based on an event according to an embodiment.

Referring to FIG. 6, vehicles 611, 612, 613, 614, 621, 622, 623, and 624 and RSUs 631, 633, and 635 are exemplified in a traffic environment (e.g., a highway or a dedicated automobile lane) in which a driving direction is specified. The vehicles 611, 612, 613, 614, 621, 622, 623, and 624 exemplify vehicles 211, 212, and 213 of FIG. 2 or vehicle 210 of FIG. 5. The description of the vehicle described in FIGS. 2 to 5 may be applied to the vehicles 611, 612, 613, 614, 621, 622, 623, and 624. The RSUs 631, 633, and 635 exemplify the RSUs 231, 233, and 235 of FIG. 2 or the RSU 230 of FIG. 5. The description of the RSU described in FIGS. 2 to 5 may be applied to the RSUs 631, 633, and 635.

The vehicle may move according to the driving direction. The driving direction may be determined according to the lane in which the vehicle is driving. For example, the vehicle 611, the vehicle 612, the vehicle 613, and the vehicle 614 may be driving in the upper lane among the two lanes. The driving direction of the upper lane may be from left to right. The vehicle 621, the vehicle 622, the vehicle 623, and the vehicle 624 may be driving in a lower lane among the two lanes. The driving direction of the lower lane may be from right to left.

The RSU may provide wireless coverage to support vehicle communication (e.g., V2I). The RSU may perform communication with a vehicle entering within the wireless coverage. For example, the RSU 631 may perform communication with the vehicle 614 and the vehicle 621 within the coverage 651 of the RSU 631. The RSU 633 may perform communication with the vehicle 612, the vehicle 613, the vehicle 622, and the vehicle 623 within the coverage 653 of the RSU 633. The RSU 635 may perform communication with the vehicle 611 and the vehicle 624 within the coverage 655 of the RSU 635.

Each RSU may be connected to a RSU controller 240 through the Internet 609. Each RSU may be connected to the RSU controller 240 through a wired network or to the RSU controller 240 through a backhaul interface (or a fronthaul interface). In addition, each RSU may be connected to a certification authority server 560 through the Internet 609. The RSU may be connected to the certification authority server 560 through the RSU controller 240, or may be directly connected to the certification authority server 560. The certification authority server 560 may authenticate and manage the RSU and the vehicle.

Assume a situation in which an event occurs in the vehicle 612 within the coverage of the RSU 633. A situation in which normal driving of the vehicle 612 is difficult may be detected due to the vehicle 612 hitting an unexpected obstacle or a functional defect of the vehicle 612. The vehicle 612 may notify another vehicle (e.g., the vehicle 613, the vehicle 622, or the vehicle 623) or RSU (e.g., the RSU 633) of events of vehicle 612. The vehicle 612 may broadcast an event message including information related to the event.

The event message according to the embodiments of the present disclosure may include various information to operate the autonomous driving service more accurately and efficiently. Hereinafter, elements included in the event message are exemplified. Not all of the elements to be described below must be included in the event message, and in some embodiments, at least some of the elements to be described below may be included in the event message.

According to an embodiment, the event message may include vehicle information. The vehicle information may include information indicating the vehicle that generated the event message. For example, the vehicle information may include vehicle ID. In addition, for example, the vehicle information is information on the vehicle itself and may include information on the vehicle type (e.g., vehicle model, brand), vehicle year, or mileage.

According to an embodiment, the event message may include RSU information. For example, the RSU information may include identification information (e.g., serving RSU ID) in the serving RSU of the vehicle (hereinafter, source vehicle) in which the event occurred. In addition, for example, the RSU information may include driving information of the vehicle in which the event occurred or identification information (e.g., RSU ID list) of RSUs according to the driving path.

According to an embodiment, the event message may include location information. For example, the location information may include information on a location where the event occurs. In addition, for example, the location information may include information on the current location of the source vehicle. In addition, for example, the location information may include information on a location where the event message is generated. The location information may indicate accurate location coordinates. In addition, as an additional embodiment, the location information may further include information on whether the event occurrence point is in the middle of the road, at the entry or exit of the dedicated road, or which lane it is in.

According to an embodiment, the event message may include event-related data. The event-related data may mean data collected from the vehicle at the time the event occurs. The event-related data may mean data collected from a sensor or a vehicle during a certain interval. The certain interval may be determined based on a timing when an event occurs. For example, the certain interval may be set from before a specific time (e.g., 5 minutes) based on the timing when the event occurs, to after a specific time (e.g., 1 minute) based on the timing when the event occurs. For example, the event-related data may include at least one of image data, impact data, steering data, speed data, acceleration data, braking data, location data, and sensor data (e.g., light detection and ranging (LiDAR) sensor, radio detection and ranging (RADAR) sensor data).

According to an embodiment, the event message may include priority information. The priority information may be information for indicating importance of the event that has occurred. For example, '1' of the priority information may indicate that a collision or fire occurs in the vehicle. '2' of the priority information may indicate a vehicle's own failure. '3' of the priority information may indicate that an object on the road exists. '4' of the priority information may mean that the pre-stored map data and current road information are different. A higher priority information value means lower priority.

According to an embodiment, the event message may include event type information. Like the priority information, depending on the type of event that occurred in the vehicle, the service provider for the autonomous driving service may provide adaptive path settings or adaptive notifications. For example, in case that there is a temporary defect in the vehicle (e.g., foreign object detection, display defect regarding a display, media application termination, buffering of control commands, side mirror malfunction), but it does not affect other vehicles, the service provider may not change driving information for vehicles outside a certain distance. In addition, for example, in case that the vehicle is discharged or fuel is low, the service provider may calculate the normalization time and may reset the driving information based on the normalization time. To this end, a plurality of types of vehicle events may be defined in advance for each stage, and the event type information may indicate at least one of the plurality of types.

According to an embodiment, the event message may include driving direction information. The driving direction information may indicate a driving direction of the vehicle. The road may be divided into a first lane and a second lane based on a direction in which the vehicle drives. Based on the driver of a specific vehicle, the first lane has a driving direction toward the driver, and the second lane has a driving direction in which the driver faces. For example, when the vehicle moves along the first lane, the driving direction information may indicate '1', and when the vehicle moves along the second lane, the driving direction information may indicate '0'. For example, since the vehicle 612 is driving on the first lane, the vehicle 612 may transmit an event message including the driving direction information indicating '1'. For another example, since the vehicle 621 is driving on the second lane, the vehicle 621 may transmit an event message including the driving direction information indicating '0'. In case that the driving direction of the source vehicle and the driving direction of the receiving vehicle are different, the driving information of the receiving vehicle does not need to be changed based on the event. Thus, in order to improve the efficiency of the autonomous driving service through the event message, the driving direction information may be included in the event message.

According to an embodiment, the event message may further include lane information. Like the driving direction information, an event of a vehicle located in the first lane may have little effect on a vehicle located in the fourth lane. The service provider may provide adaptive path setting for each lane. To this end, the source vehicle may include lane information in the event message.

According to an embodiment, the event message may include information (hereinafter, generation time information) on a time when the event message is generated. The event message may be provided through a link between the vehicle and the vehicle and/or the vehicle and the RSU. In other words, since the event message is delivered through a multi-hop method, a situation in which the event message is received after sufficient time has elapsed after the event occurs may occur. In order to identify a timing when an event occurs in a vehicle that has received the event message, the generation time information may be included in the event message.

According to an embodiment, the event message may include transmission method information. The event message may be provided from the RSU back to other vehicles through the link between the vehicle and the vehicle and/or the vehicle and the RSU. Thus, in order for the vehicle or RSU that receives the event message to recognize the transmission method of the currently received event message, the transmission method information may be included in the event message. The transmission method information may indicate whether the event message was transmitted through a V2V method or a V2R (or R2V) method.

According to an embodiment, the event message may include vehicle maneuver information. The vehicle maneuver information may refer to information about the vehicle itself when an event occurs. For example, the vehicle maneuver information may include information on a state of the vehicle, a wheel of the vehicle, and whether a door is opened or closed according to the occurrence of the event.

According to an embodiment, the event message may include driver behavior information. The driver behavior information may mean information on vehicle operation of the driver when the event occurs. The driver behavior information may mean information in which the autonomous driving mode is released and is manually operated by the user. For example, the driver behavior information may include information on braking, steering wheel operation, starting, and the like when the event occurs.

For example, a message transmitted from the vehicle 612 may have a message format as shown in the following table.

TABLE 4

| Field | Description | Note |
|---|---|---|
| Source Vehicle | Information indicating the Vehicle that generated the Event message | Source Vehicle: True Other vehicle: False |
| Vehicle ID | Vehicle Identifier | allocated to Vehicle |
| Message Type | Event message | Indicates the Message Type |
| Location Information | Location information where Event message was generated | |
| Event-related data | Image data, Impact data, steering data, speed data, acceleration data, braking data, location data | Information obtained related to the Event |
| Generated Time | Message generation time | Use for determining whether the message validity period has expired |
| Serving RSU Information | Serving RSU ID | Serving RSU ID of the coverage where the vehicle is located |
| Driving direction | Information indicating the driving direction of the source vehicle where the event occurred | "1" or "2" |
| Transmission Information | Information on the transmission method by which the event message was sent | Information indicating whether the event message was transmitted through V2V communication method or V2R (R2V) communication method |
| Priority Information | "1" in case of collision occurrence or fire occurrence of the source vehicle "2" in case of failure occurrence of the source vehicle "3" in case of detecting the existence of dangerous objects on the road "4" in case of obtaining road information that is different from the previously stored electronic map data | Predetermined depending on the type of event that may occur on the road |
| Vehicle maneuver information | GPS, odometry information, a gyro information and kinematic information | Vehicle maneuver information when the event occurred |
| Driver behavior information | When the event occurred, information which human driver operates to maneuver a vehicle. | Driver behavior information when an Event occurs (Vehicle operation information) information in which the autonomous driving mode is released and is manually operated by the user |

Meanwhile, the event message exemplified in Table 4 is exemplary, and embodiments of the present disclosure are not limited thereto. In order to lighten the event message, at least one (e.g., transmission information of the event message) of the elements of the event message may be omitted.

Figure 7:
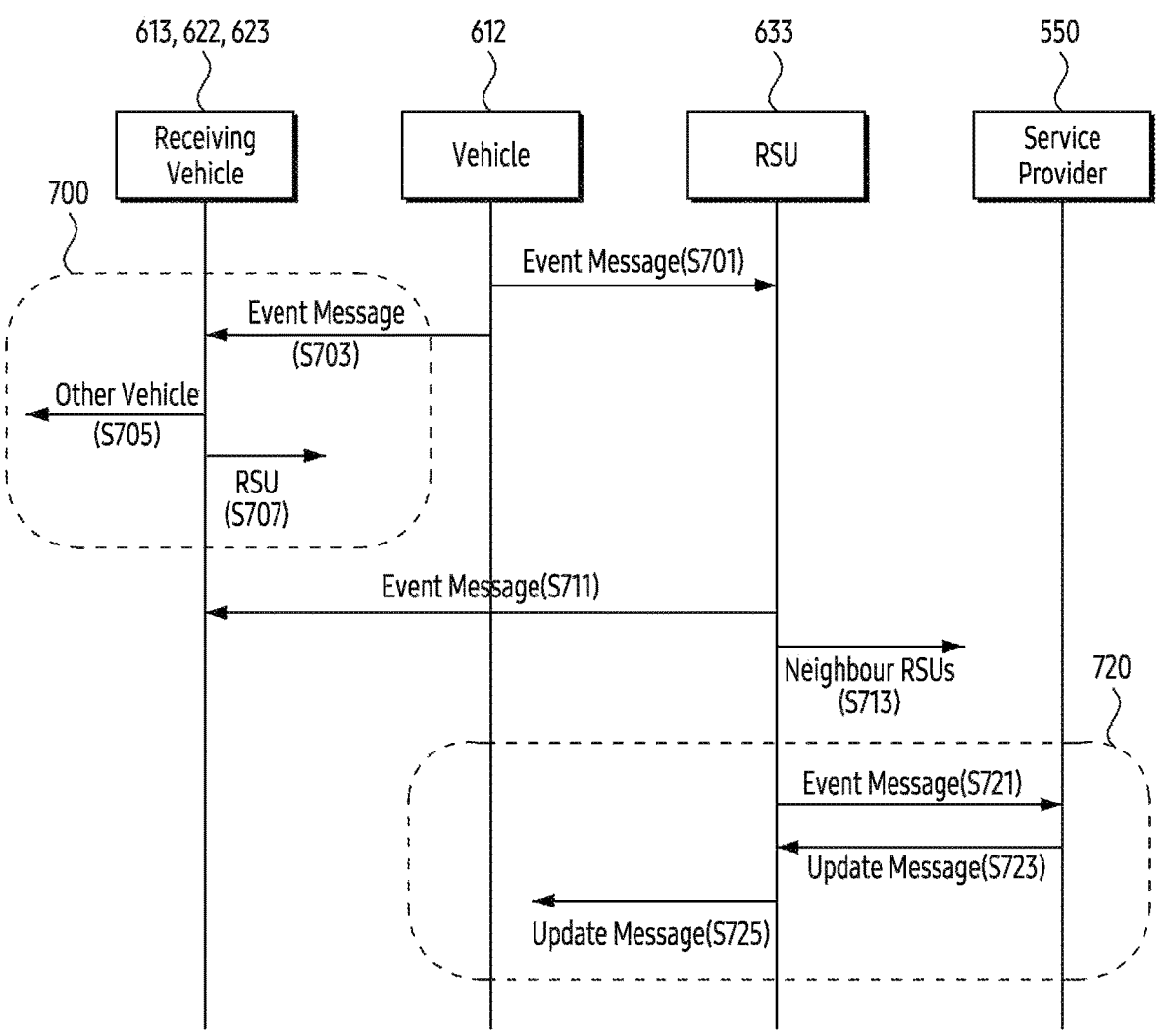
FIG. 7 illustrates an example of signaling between entities for setting a driving path based on an event according to an embodiment.

FIG. 7 illustrates an example of signaling between entities for setting a driving path based on an event according to an embodiment. In FIG. 7, an example of resetting the driving path based on an event of a vehicle 612 of FIG. 6 is described.

Referring to FIG. 7, in operation S701, the vehicle 612 may transmit an event message to a RSU 633. The vehicle 612 may detect the occurrence of an event of the vehicle 612. The vehicle 612 may generate the event message based on the event of the vehicle 612. The vehicle 612 may transmit the event message to the RSU 633 which is the serving RSU of the vehicle 612. The event message may be an event message described in FIG. 6. According to an embodiment, the event message may include at least one of vehicle information, RSU information, location information, event-related data, priority information, event type information, driving direction information, lane information, generation time information, transmission method information, vehicle maneuver information, and driver behavior information.

The vehicle 612 may transmit the event message not only to the serving RSU but also to another vehicle or another RSU in procedure 700. In operation S703, the vehicle 612 may transmit the event message to another vehicle (hereinafter, a receiving vehicle). In operation S705, the receiving vehicle (e.g., a vehicle 613, a vehicle 622, and a vehicle 623) may transmit the event message to another vehicle. In operation S707, the receiving vehicle may transmit the event message to another RSU.

When the RSU 633 receives the event message from the vehicle 612, the RSU 633 may perform integrity verification on the event message. When the RSU 633 receives the event message from the vehicle 612, the RSU 633 may perform decryption for the event message. Once the integrity and the decryption are completed, the RSU 633 may transmit the event message to another receiving vehicle (e.g., the vehicle 613) or a neighboring RSU (e.g., a RSU 635). In operation S711, the RSU 633 may transmit the event message to the receiving vehicle. In operation S713, the RSU 633 may transmit the event message to another RSU.

The RSU 633 may update autonomous driving data based on the event of the vehicle 612 in procedure 720. In operation S721, the RSU 633 may transmit the event message to a service provider server 550. The event of the vehicle 612 may affect not only the vehicle 612 but also other vehicles. Thus, the RSU 633 may transmit the event message to the service provider server 550 to reset the driving path of the vehicle which is using an autonomous driving service.

In operation S723, the service provider server 550 may transmit an update message to the RSU 633. The service provider server 550 may reset the driving path for each vehicle based on the event. If the driving path needs to be changed, the service provider server 550 may generate an update message including reset driving path information.

According to an embodiment, the update message may include driving plan information. The driving plan information may mean a newly calculated driving path from the current point of the corresponding vehicle (e.g., the vehicle 612, and the vehicle 613) to the previous destination. In addition, according to an embodiment, the update message may include a list of one or more RSUs existing on the calculated path. If the driving path is changed, the RSU adjacent to or located in the driving path also changes, so a list of updated RSUs may be included in the update message. In addition, according to an embodiment, the update message may include encryption information. This is because the driving path has changed, so the RSU ID for the RSU adjacent to or located on the driving path changes. Meanwhile, encryption information on RSUs that are duplicated due to update may be omitted from the update message in order to make the update message lighter.

TABLE 5

| Field | Description | Note |
|---|---|---|
| Route plan information | Link ID, Node ID, route ID and cost value for each route ID related to planned route | Route planning information calculated from the Start point to the Destination point (hereinafter, driving plan information) |
| Neighbor RSU List | Please refer to the Table 3 | RSU List information existing on the calculated route (e.g., a list of RSU IDs allocated by RSU controller 240) |
| Pre- EncryptionKey | Please refer to the Table 3 | N Pre-Encryption keys allocated to each RSU which is existing on the route (here, N is an integer greater than or equal to 1) |

In operation S725, the RSU 633 may transmit the update message to the vehicle 613, the vehicle 622, and the vehicle 623. The update message received from the service provider server 550 may include driving information for each vehicle within the coverage of the RSU 633, and the RSU 633 may identify driving information for the vehicle 612. The RSU 633 may transmit the update message including the driving information for the vehicle 612 to the vehicle 612.

According to an embodiment, the event message transmitted from the vehicle (e.g., the vehicle 612, and the vehicle 613) may be encrypted based on the private key of the vehicle. A private key of the vehicle and a public key of the RSU (e.g., the RSU 633) which serves the vehicle may be used for an asymmetric key algorithm. The sender may transmit a message (e.g., an event message of operation S701) by using the symmetric key or the private key corresponding to the public key of the RSU. For example, the sender may be the vehicle. Only if the receiver knows the symmetric key or the public key of the RSU, the message may be decrypted. If the receiver is a vehicle (hereinafter, a receiving vehicle) that knows the public key of the RSU, the receiving vehicle may decrypt the event message even if the receiver is in coverage of an RSU different from the serving RSU of the vehicle that transmitted the event message. To this end, the receiving vehicle may obtain and store encryption information (e.g., pre-encryption key) on the RSU on the driving path in advance through a service response message (e.g., a service response message of FIG. 5).

In FIG. 7, only the operation of the serving RSU (e.g., the RSU 633) of the vehicle (e.g., the vehicle 612) in which an accident occurred is described, but embodiments of the present disclosure are not limited thereto. The driving information reset according to the event message must also be shared with other RSUs (e.g., the RSU 631 and the RSU 635) and other vehicles (e.g., the vehicle 614 and the vehicle 621). The service provider server 550 may also transmit the update message to other vehicles through another RSU.

Although not illustrated in FIG. 7, the vehicle 612 in which the accident occurs may terminate autonomous driving. The vehicle 612 may transmit a service termination message to the service provider server 550 through the RSU 633. Thereafter, the service provider server 550 may discard the information on the vehicle 612 and the information on the user of the vehicle 612.

(3) Driving Path and RSU

Figure 8A:
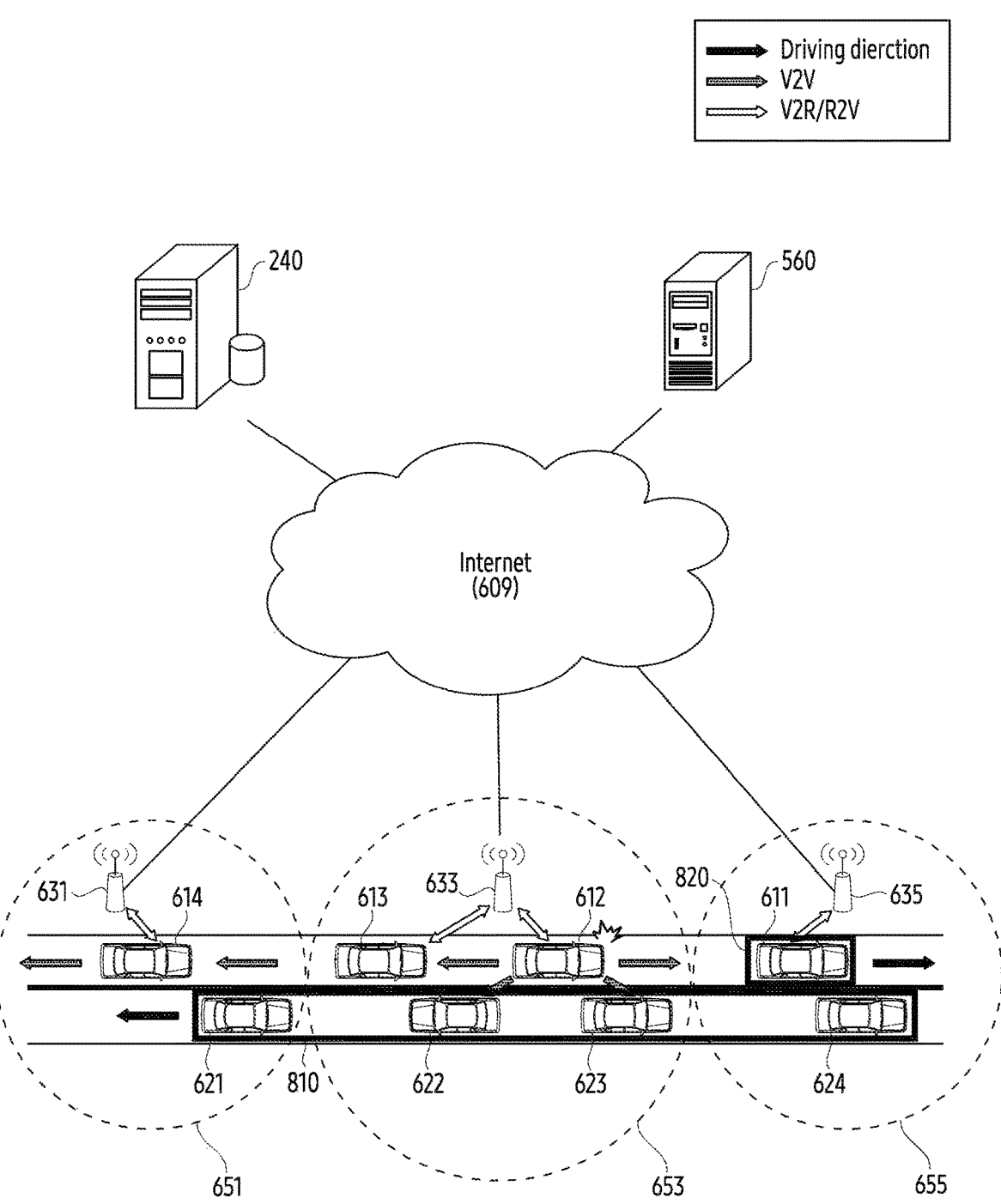
FIGS. 8A to 8C illustrate examples of efficient processing of event messages when setting a driving path based on an event according to an embodiment.
Figure 8B:
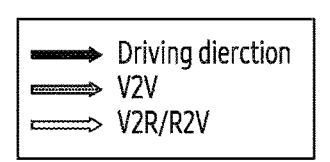
Figure 8C:
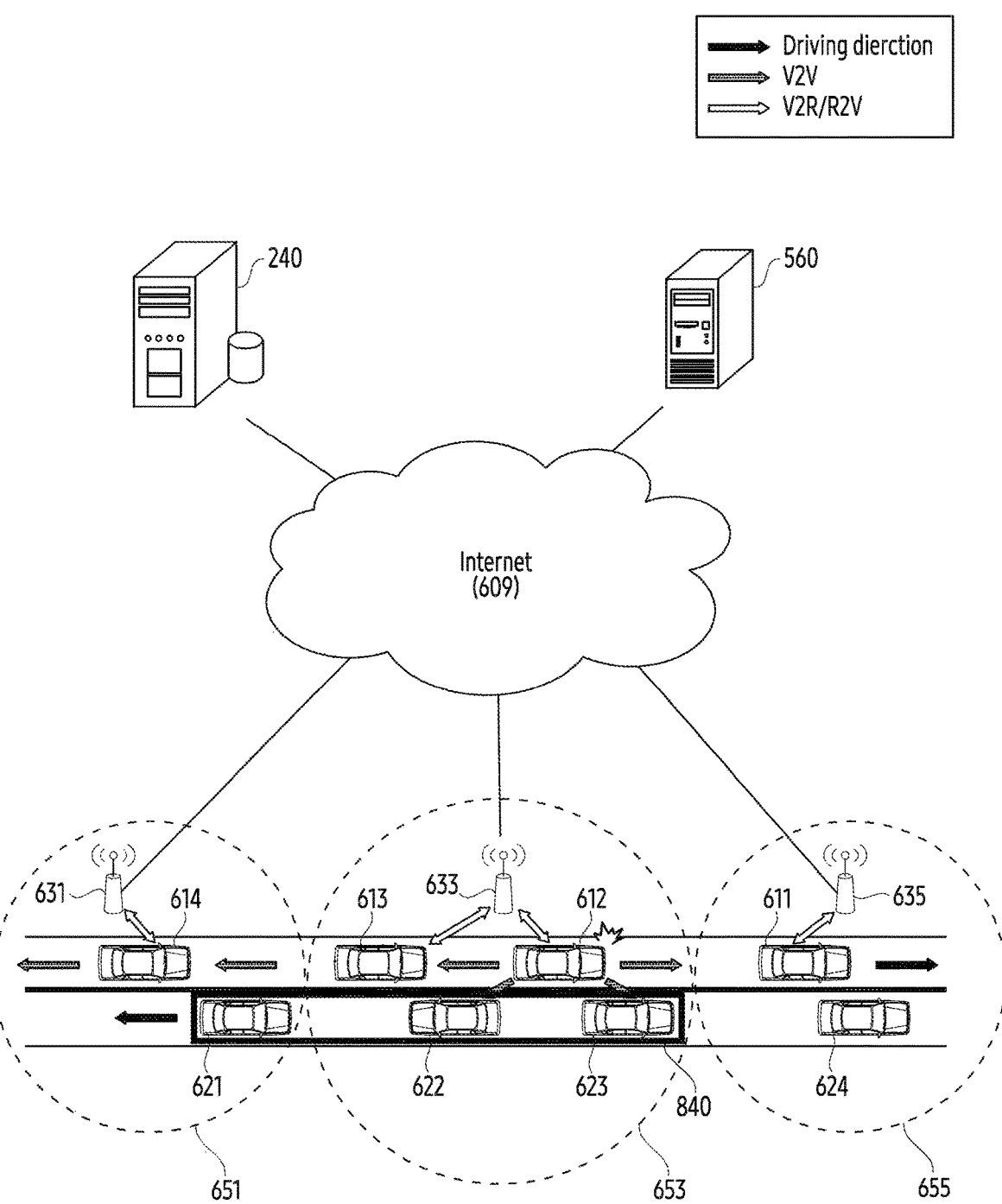

FIGS. 8A to 8C illustrate an example of efficiently processing an event message when setting a driving path based on an event according to an embodiment. In order to describe the driving environment related to the event, the driving environment of FIG. 6 is illustrated. The same reference numerals may be used for the same description.

Referring to FIG. 8A, a vehicle 611, a vehicle 612, a vehicle 613, and a vehicle 614 may be driving on a first lane. A driving direction of the first lane may be from left to right. The first lane may be the left path based on the driving direction of the driver. A vehicle 621, a vehicle 622, a vehicle 623, and a vehicle 624 may be driving in a second lane. The driving direction of the second lane may be from right to left. The driving direction of the second lane may be opposite to the driving direction of the first lane.

A vehicle that is not affected by the event of a specific vehicle does not need to be aware of the event of the specific vehicle. Here, not being affected by the event means that the driving plan of the vehicle does not change due to the event. Hereinafter, for convenience of explanation, the vehicle that is not affected by the event of the specific vehicle may be referred to as an independent vehicle for the event. Conversely, the vehicle affected by the event of the specific vehicle may be referred to as a dependent vehicle for the event.

Vehicles 810 in which the driving direction of the source vehicle is different from the driving direction of the receiving vehicle may correspond to the independent vehicle. The driving information of the independent vehicle does not need to be changed based on the event. For example, in case that the driving direction of the vehicle 612 is a first lane direction (e.g., from left to right), the vehicle 621, the vehicle 622, the vehicle 623, and the vehicle 624 in which the driving direction is a second lane direction (e.g., from right to left) are not affected by the event. In addition, vehicles 820 (e.g., the vehicle 611) located ahead of the source vehicle (e.g., the vehicle 612) may correspond to the independent vehicle. The independent vehicle may not be affected by information on the event. Since it is not common (almost non-existent) for a vehicle to suddenly reverse on a car road, the vehicle 611 ahead of the vehicle 612 based on the driving direction may not be affected by events due to an accident, defect, failure, and the like of the vehicle 612.

The influence due to the event may be identified according to whether driving plan information for the autonomous driving service is changed. If the expected driving path of the specific vehicle (e.g., the vehicle 613) is changed before and after the event occurs, it may be interpreted that the specific vehicle is affected by the event occurrence. The specific vehicle may be the dependent vehicle for the event. Embodiments of the present disclosure propose a method for reducing the update of an unnecessary driving path, when the event occurs in the vehicle, even if a vehicle unrelated to the event, that is, the independent vehicle, does not receive the event message, and even if it does receive the event message.

In order to determine whether the vehicle and the event are related, an encryption method, an RSU ID, and the driving direction may be used.

According to an embodiment, the encryption method means encryption information (e.g., the public key or the symmetric key of the used RSU) applied to the event message notifying the event. In addition, according to an embodiment, the RSU ID may be used to identify whether a specific RSU is included in the RSU list included in the driving path of the vehicle. In addition, according to an embodiment, the driving direction may be used to distinguish between the dependent vehicle affected by the event and the independent vehicle not affected by the event.

Referring to FIG. 8B, the driving path of the vehicle may be related to RSUs. For example, the driving path of the vehicle may be expressed by RSU IDs. A service response message (e.g., a service response message of FIG. 5) may include the RSU list on the path of the driving plan information. The RSU list may include one or more RSU IDs. For example, the RSU list for the driving path for the vehicle 612 may include an RSU ID for the RSU 633 and an RSU ID for the RSU 635. The vehicle 612 is currently located within the coverage of the RSU 633, but may be expected to be located within the coverage of the RSU 635 in the driving direction. Based on the driving direction of the vehicle (i.e., the source vehicle) in which the event occurred, vehicles within a coverage 830 of the RSU in a location ahead of the vehicle may not be affected by the event. In other words, all vehicles within the coverage 830 of the RSU may be independent vehicles for the event.

According to an embodiment, the RSU may broadcast an event message received from an adjacent RSU to vehicles in the RSU. However, an RSU (e.g., the RSU 635) located in an area ahead of the vehicle does not need to receive the event message and does not need to transmit the event message to another vehicle within the coverage 830. As an implementation example, the RSU controller 240 or the serving RSU (e.g., the RSU 633) may not deliver the event message to the RSU disposed at the location ahead of the vehicle according to the driving path of the source vehicle. In addition, as an implementation example, when the RSU receives the event message from the serving RSU, another RSU, or the RSU controller 240, the RSU may not redeliver the event message based on the location of the serving RSU and the driving path (e.g., the RSU list) of the vehicle.

According to an embodiment, the service provider may reset driving path information based on the event of the vehicle. However, the driving path information for vehicles (e.g., the vehicle 611 and the vehicle 624) of the RSU (e.g., the RSU 635) located in the area ahead of the vehicle does not need to be updated. The service provider may not transmit the update message to the RSU. Thus, the update message such as operation S723 of FIG. 7 may not be transmitted to at least some RSUs. Since the RSU has not received the update message, the vehicle (e.g., the vehicle 611) in the coverage (e.g., the coverage 830) of the RSU may perform autonomous driving based on previously provided autonomous driving information.

Referring to FIG. 8C, the driving direction of the vehicle may be divided into the same direction as the driving direction of the event vehicle or a direction different from the driving direction of the event vehicle. The vehicle that generated the event message may include information on the driving direction in the event message. Since the event message is delivered to another vehicle or RSU through a multi-hop method, the receiving vehicle may know the driving direction of the vehicle (i.e., the source vehicle) in which the event occurred.

The vehicle 611, the vehicle 612, the vehicle 613, and vehicle 614 may be driving on the first lane. The driving direction of the first lane may be from left to right. The vehicle 621, the vehicle 622, the vehicle 623, and the vehicle 624 may be driving in the second lane. The driving direction of the second lane may be from right to left. The vehicle receiving the event message may determine whether the vehicle is the independent vehicle or the dependent vehicle based on the driving direction of the source vehicle. The vehicle receiving the event message may be identified as the independent vehicle, in case that it has the same driving direction as the driving direction of the source vehicle. The vehicle receiving the event message may be identified as the dependent vehicle, in case that it has the different driving direction from the driving direction of the source vehicle.

The event message may include driving direction information of the source vehicle (e.g., the vehicle 612). For example, the driving direction information of the vehicle 612 may indicate '1'. The vehicle 622 may receive the event message. The vehicle 622 may receive the event message from the RSU 633 or the vehicle 612. Since the driving direction information of the vehicle 622 is '0' and the driving direction information of the vehicle 612 is '1', the vehicle 622 may ignore the event message. The vehicle 622 may discard the event message. In this way, the vehicle 621, the vehicle 622, and the vehicle 623 may ignore the received event message, as a dependent vehicle 840. Meanwhile, since the RSU 635 is located ahead of the driving path of the vehicle 612, the vehicle 624 within the RSU 635 may not receive an event message for determining the driving direction.

Figure 9:
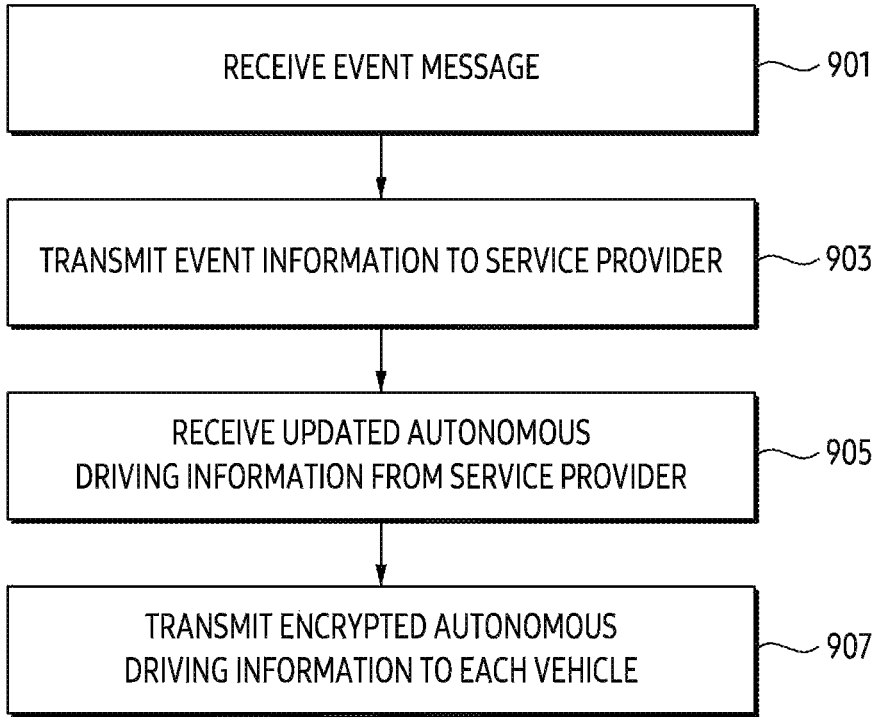
FIG. 9 illustrates an operation flow of an RSU for processing an event message according to an embodiment.

FIG. 9 illustrates an operation flow of an RSU for processing an event message according to an embodiment.

Referring to FIG. 9, in operation 901, the RSU may receive the event message. The RSU may receive the event message from the vehicle. The event message may include information on an event that occurred in the vehicle or another vehicle. In addition, for another example, the RSU may receive the event message from an adjacent RSU in addition to the vehicle. The event message may be an event message described in FIG. 6. According to an embodiment, the event message may include at least one of vehicle information, RSU information, location information, event-related data, priority information, event type information, driving direction information, lane information, generation time information, transmission method information, vehicle maneuver information, and driver behavior information.

According to an embodiment, the RSU may decrypt the event message. The RSU may identify whether the event message is encrypted based on encryption information on the RSU. The encryption information on the RSU may mean key information used to enable decryption within the coverage of the RSU. The encryption information on the RSU may be valid only within the coverage of the RSU. For example, the RSU may include the key information (e.g., 'Encryption Key/Decryption Key' of Table 1) in a broadcast message (e.g., a broadcast message of Table 1). In addition, for example, the RSU may include the encryption information (e.g., pre-encryption key of Table 3) on the RSU in a service response message (e.g., a service response message of FIG. 5) when requesting an autonomous driving service. The encryption information may be RSU-specific.

According to an embodiment, the RSU may perform an integrity check of the event message. The RSU may discard the event message through the integrity check or may obtain information in the event message through decoding of the event message. For example, if the integrity check passes, the RSU may identify the priority for the event based on the priority information of the event message. In case that the RSU has a priority higher than the designated value, it may deliver the event message to the emergency center. Here, the event message may be encrypted based on the encryption information of the RSU.

Although not illustrated in FIG. 9, the RSU may deliver the received event message to another RSU or another vehicle. According to an embodiment, the RSU may deliver the event message to another RSU based on the driving direction information. For example, a RSU 633 of FIG. 8B may deliver the event message to the RSU 631. However, the RSU 633 may not deliver the event message to a RSU 635. This is because the RSU 635 is deployed in the preceding area based on the driving direction of the source vehicle where the event occurred, that is, a vehicle 612. In addition, according to an embodiment, the RSU may generate the event message based on the encryption information on the RSU. The RSU may generate another event message including information received from the vehicle. The RSU may enable only other vehicles within the coverage of the RSU to receive the other event message, by encrypting the other event message through the encryption information on the RSU.

In operation 903, the RSU may transmit event information to a service provider. In response to an event of the vehicle, driving plan information of an autonomous driving service being provided needs to be changed. The RSU may transmit the event information to the service provider in order to update the driving plan information of the vehicle.

In operation 905, the RSU may receive updated autonomous driving information from the service provider. The service provider may identify vehicles located behind the source vehicle on receiving the event information. Based on the source vehicle (e.g., the vehicle 612 of FIGS. 8A to 8C), receiving vehicles (e.g., a vehicle 613, and a vehicle 614) located behind the source vehicle may be affected by an accident of the source vehicle. In other words, the receiving vehicles (e.g., the vehicle 613, and the vehicle 614) located behind the source vehicle may be a dependent vehicle for the event of the source vehicle.

The service provider may change the autonomous driving information (e.g., the driving plan information) on the dependent vehicle. The service provider may obtain the autonomous driving information reflecting an event for the source vehicle. The RSU may receive the autonomous driving information changed due to the occurrence of the event through an update message from the service provider. The service provider may transmit the autonomous driving information on the dependent vehicle to the RSU within coverage of the RSU.

In operation 907, the RSU may transmit encrypted autonomous driving information to each vehicle. The RSU may transmit the update message including the autonomous driving information to each vehicle. In this case, rather than transmitting the autonomous driving information to all vehicles, the RSU may transmit the updated autonomous driving information to the corresponding vehicle in a unicast method. This is because each vehicle has a different driving plan. According to an embodiment, the RSU may transmit the autonomous driving information to each vehicle based on the encryption information on the RSU.

Figure 10:
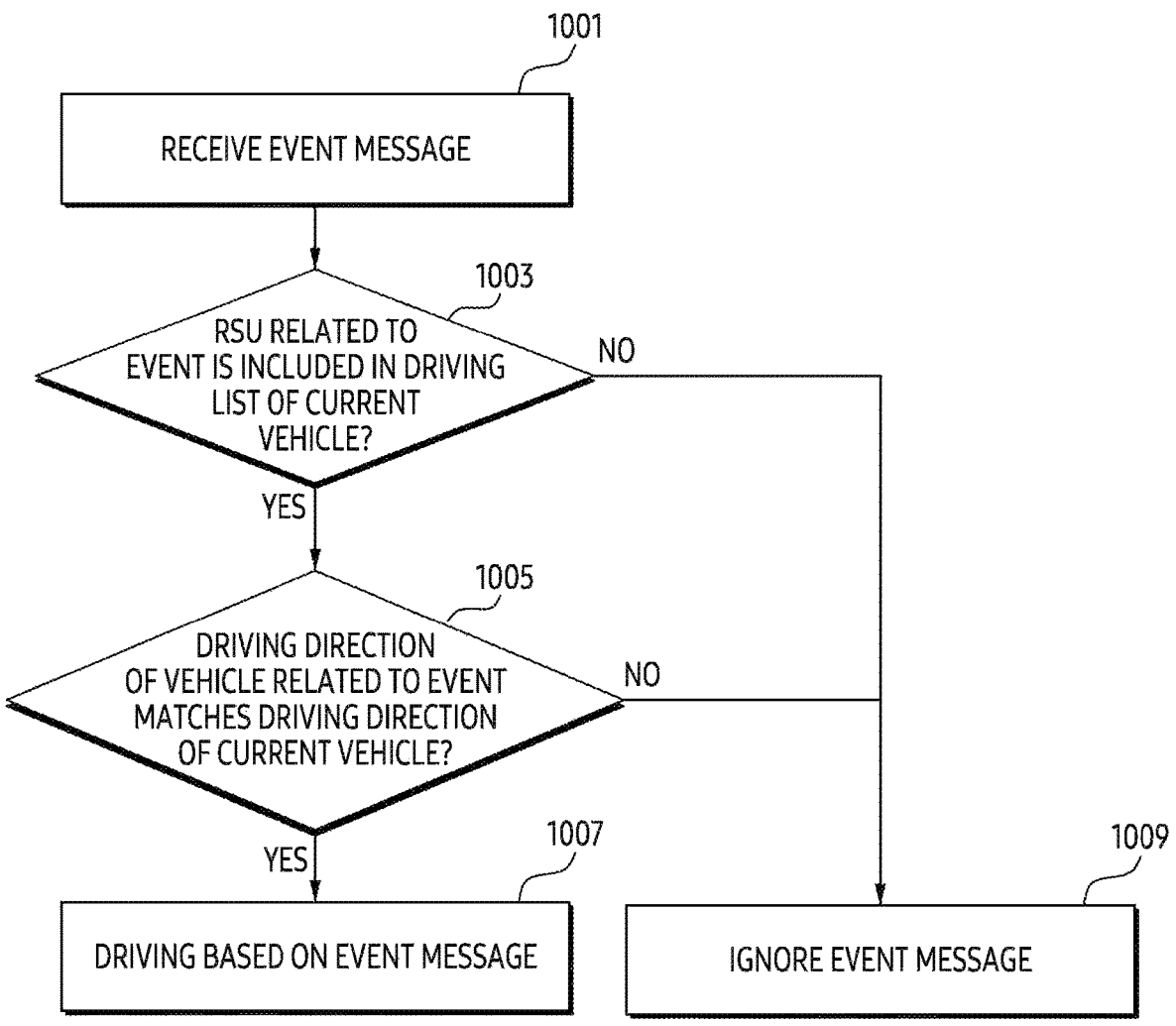
FIG. 10 illustrates an operation flow of a vehicle for processing an event message according to an embodiment.

FIG. 10 illustrates an operation flow of a vehicle for processing an event message according to an embodiment. The vehicle may be referred to as a receiving vehicle. For example, the receiving vehicle exemplifies a vehicle different from a vehicle 612 in the driving environment of FIGS. 6 to 8C.

Referring to FIG. 10, in operation 1001, the receiving vehicle may receive the event message. The receiving vehicle may receive the event message from a vehicle (hereinafter, a source vehicle) in which the event occurred or an RSU. The event message may include information on an event that occurred in the source vehicle. The event message may be an event message described in FIG. 6. According to an embodiment, the event message may include at least one of vehicle information, RSU information, location information, event-related data, priority information, event type information, driving direction information, lane information, generation time information, transmission method information, vehicle maneuver information, and driver behavior information.

According to an embodiment, the receiving vehicle may decrypt the event message. The receiving vehicle may identify whether the event message is encrypted based on encryption information on the RSU. The encryption information on the RSU may mean key information used to enable decryption within the coverage of the RSU. The encryption information may be RSU-specific.

According to an embodiment, the receiving vehicle may know encryption information on the RSU for coverage in which the receiving vehicle is located through the key information (e.g., 'Encryption Key/Decryption Key' of Table 1) included in a broadcast message (e.g., a broadcast message of FIG. 5). In addition, the receiving vehicle may know the RSUs of the neighboring RSU list and the encryption information for each RSU through the encryption information (pre-encryption key of Table 3) included in a service response message (e.g., a service response message of FIG. 5). When the event occurs, the vehicle may transmit the event message based on the encryption information on the RSU of the vehicle. In other words, even if the receiving vehicle receives the event message from another vehicle, if the driving path of the receiving vehicle includes the RSU of the other vehicle, the receiving vehicle may know the encryption information on the RSU in advance. The receiving vehicle may decrypt the event message through a public key algorithm or a symmetric key algorithm. The receiving vehicle may obtain information on the serving RSU that services the source vehicle from the event message. The receiving vehicle may obtain information on the driving direction of the source vehicle from the event message.

In operation 1003, the receiving vehicle may identify whether an RSU related to the event is included in the driving list of the current vehicle (i.e., the receiving vehicle). The receiving vehicle may identify the RSU related to the event from the information (e.g., serving RSU ID of Table 4) of the event message. The receiving vehicle may identify one or more RSUs in the driving list of the receiving vehicle. The driving list (e.g., Neighbor RSU List of Table 3) may mean a set of RSU IDs for RSU(s) located on the expected path for an autonomous driving service. Since the receiving vehicle does not necessarily require an event in the RSU if the receiving vehicle is not an RSU scheduled to visit, the receiving vehicle may determine whether the RSU related to the event is related to the receiving vehicle. In case that the RSU related to the event is included in the driving list of the receiving vehicle, the receiving vehicle may perform operation 1005. In case that the RSU related to the event is not included in the driving list of the receiving vehicle, the receiving vehicle may perform operation 1009.

In operation 1005, the receiving vehicle may identify whether the driving direction of the vehicle related to the event matches the driving direction of the current vehicle. The receiving vehicle may identify the driving direction information of the source vehicle from the information (e.g., the driving direction of Table 4) of the event message. The receiving vehicle may identify the driving direction of the current vehicle. According to an embodiment, the driving direction may be determined as a relative value. For example, a road may be configured with two lanes. The two lanes may include a first lane providing a driving direction of a first direction and a second lane providing a driving direction of a second direction. The driving direction may be relatively determined by a reference to an RSU (e.g., a RSU 230), an RSU controller (e.g., RSU controller 240), or a service provider (e.g., service provider server 550). For example, 1-bit for indicating direction may be used. The bit value may be set to '1' for the first direction and '0' for the second direction. According to another embodiment, the driving direction may be determined in an absolute direction through the movement of vehicle sensors.

In case that the driving direction of the vehicle (e.g., the source vehicle) related to event matches the driving direction of the receiving vehicle, the receiving vehicle may perform operation 1007. In case that the driving direction of the vehicle (e.g., the source vehicle) related to the event does not match the driving direction of the receiving vehicle, the receiving vehicle may perform operation 1009.

In operation 1007, the receiving vehicle may perform driving according to the event message. The receiving vehicle may perform driving based on other information (e.g., event occurrence location, event type) in the event message. For example, the receiving vehicle may perform an operation to prevent an accident of the receiving vehicle based on the event message. Additionally, the receiving vehicle may determine that delivery of the event message is necessary. The receiving vehicle may deliver the encrypted event message to the RSU of the receiving vehicle or another vehicle.

In operation 1009, the receiving vehicle may ignore the event message. The receiving vehicle may determine that the event indicated in the event message does not directly affect the receiving vehicle. The receiving vehicle may identify that the event of the source vehicle having a driving direction different from the driving direction of the receiving vehicle does not affect the driving of the receiving vehicle. If there is no source vehicle in the driving path of the receiving vehicle, the receiving vehicle does not have to change the driving setting by decoding or processing the event message for the source vehicle.

In FIG. 10, an example of identifying whether the receiving vehicle is an independent vehicle or a dependent vehicle for the event of the source vehicle is described based on the driving path in operation 1003 and the driving direction in operation 1005. However, the decision sequence or judgment operations in FIG. 10 are only examples for identifying whether the receiving vehicle is the independent vehicle or the dependent vehicle, and other embodiments of the present disclosure are not limited to the operations in FIG. 10. According to another embodiment, the receiving vehicle may not perform operation 1003 and may only perform operation 1005. According to another embodiment, the receiving vehicle may perform operation 1005 before operation 1003.

Figure 11:
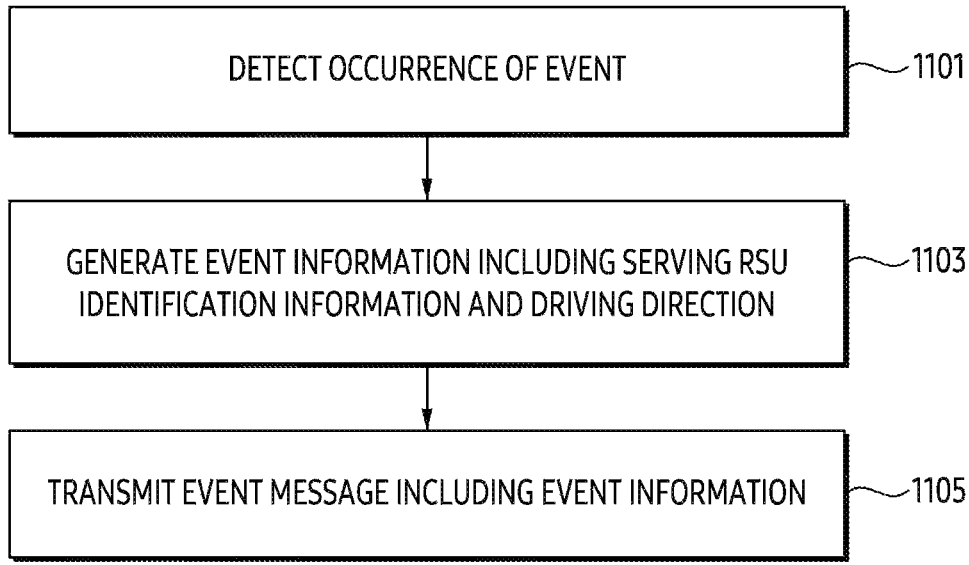
FIG. 11 illustrates an operation flow of an event-related vehicle according to an embodiment.

FIG. 11 illustrates an operation flow of an event-related vehicle according to an embodiment. The vehicle may be referred to as a source vehicle. For example, the source vehicle exemplifies a vehicle 612 in the driving environment of FIGS. 6 to 8C.

In operation 1101, the source vehicle may detect occurrence of the event. The source vehicle may detect that an event such as a collision with another vehicle, a fire in the source vehicle, and a failure of the source vehicle occurs. The source vehicle may autonomously perform vehicle control based on the detected event. The source vehicle may determine, based on the type of event, that generation of an event message is necessary. The source vehicle may determine to generate the event message, in case that the event is not resolved within a designated time or in case that it is required to notify another entity of the occurrence of the event.

In operation 1103, the source vehicle may generate event information including the serving RSU identification information and the driving direction. The source vehicle may generate event information including the ID of the RSU currently serving the source vehicle, that is, the serving RSU. The source vehicle may include information indicating the driving direction of the source vehicle in the event information.

In operation 1105, the source vehicle may transmit an event message including the event information. The source vehicle may perform encryption to transmit the event message. The source vehicle may encrypt the event message based on encryption information on the serving RSU (e.g., a RSU 633). According to an embodiment, the source vehicle may know encryption information on the RSU for coverage in which the source vehicle is located through key information (e.g., 'Encryption Key/Decryption Key' of Table 1) included in a broadcast message (e.g., a broadcast message of FIG. 5). In addition, the source vehicle may transmit the encrypted event message to other vehicles (e.g., a RSU 613, a RSU 622, and a RSU 623) except the source vehicle within the RSU.

Figure 12:
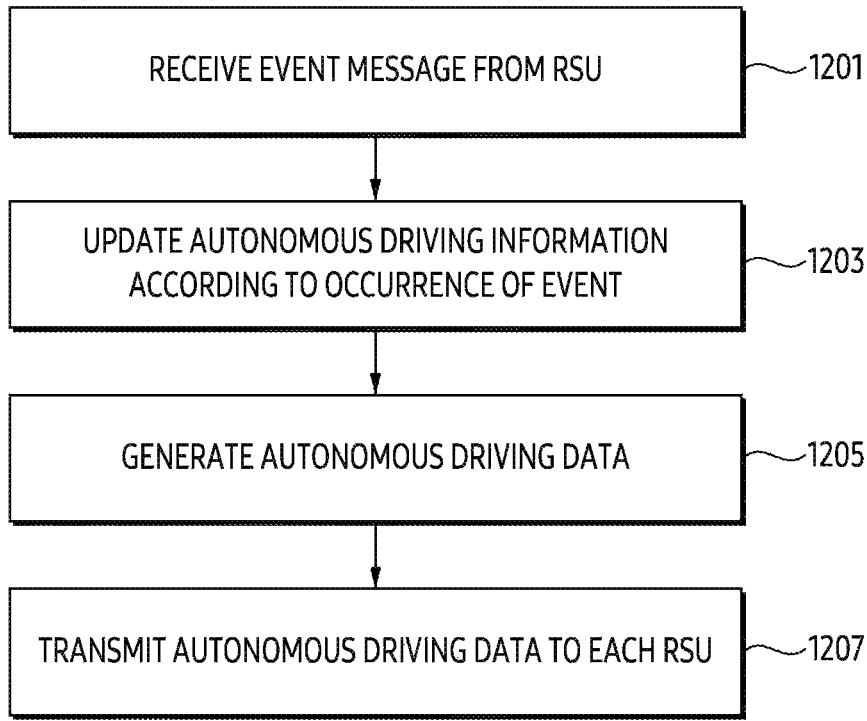
FIG. 12 illustrates an operation flow of a service provider for resetting a driving path in response to an event according to an embodiment.

FIG. 12 illustrates an operation flow of a service provider for resetting a driving path in response to an event according to an embodiment. The operation of the service provider may be performed by a service provider server (e.g., a service provider server 550).

Referring to FIG. 12, in operation 1201, the service provider server may receive an event message from the RSU. The service provider server may identify the source vehicle based on the event message. The service provider server may identify the RSU of the source vehicle, that is, the RSU ID of the serving RSU, based on the event message.

In operation 1203, the service provider server may update autonomous driving information according to the occurrence of the event. The service provider may identify a vehicle (hereinafter, a dependent vehicle) including the serving RSU of the source vehicle in which the event occurred as the driving path. The service provider server may update the autonomous driving information of the dependent vehicle. For example, the service provider server may update the autonomous driving information for each dependent vehicle. The service provider server may not update the autonomous driving information for an independent vehicle. In other words, the service provider server may update the autonomous driving information for each dependent vehicle.

In operation 1205, the service provider may generate autonomous driving data. The autonomous driving data may include the autonomous driving information for each dependent vehicle. The service provider may update the autonomous driving data based on the autonomous driving information for each dependent vehicle.

In operation 1207, the service provider may transmit the autonomous driving data to each RSU. According to an embodiment, the service provider may transmit the autonomous driving data to an RSU that services a vehicle that needs to be updated. For example, a service provider does not need to transmit updated autonomous driving data to the RSU in a location ahead of the source vehicle where the accident occurred. Meanwhile, the service provider needs to transmit the updated autonomous driving data to an RSU that is located before the source vehicle and services a vehicle that will later pass the serving RSU.

Although not illustrated in FIG. 12, the service provider may perform a service subscription procedure for the vehicle before processing the event message. When a service request message is received from the vehicle, the service provider may check whether the vehicle is a service subscriber. In case that the vehicle is the service subscriber, the service provider may obtain identifier information (e.g., vehicle ID, user ID), location information of the vehicle, and destination information from the service request message. The service provider may calculate driving plan information for the vehicle. The driving plan information may indicate a driving path from the start location of the vehicle to the destination. The service provider may transmit a service response message including the driving plan information and a list of RSU IDs existing on the path to the serving RSU. The service provider may receive a service termination notification from the vehicle or may continuously provide an autonomous driving service through an update message until the vehicle arrives at the destination. Thereafter, in case that the service provider receive the service termination notification from the vehicle or in case that the vehicle arrives at the destination, the service provider may discard information on the vehicle requesting the service and information on the user of the vehicle.

Figure 13A:
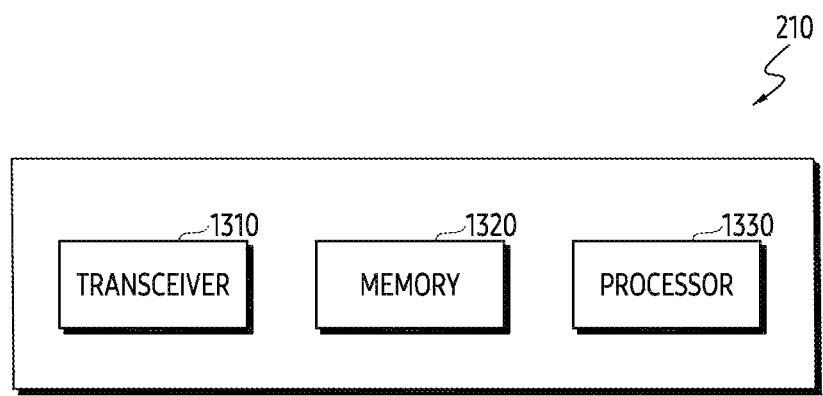
FIG. 13A illustrates an example of components of a vehicle according to an embodiment.

FIG. 13A illustrates an example of components of a vehicle 210 according to an embodiment. Terms such as ' . . . unit', ' . . . er' used below mean a unit that processes at least one function or operation, and may be implemented through hardware, software, or a combination of hardware and software.

Referring to FIG. 13A, the vehicle 210 may include at least one transceiver 1310, at least one memory 1320, and at least one processor 1330. Hereinafter, components are described in a single number, but implementation of a plurality of components or sub-components is not excluded.

The transceiver 1310 performs functions for transmitting and receiving a signal through a wireless channel. For example, the transceiver 1310 performs a conversion function between a baseband signal and a bit string according to the physical layer standard of the system. For example, when transmitting data, the transceiver 1310 generates complex symbols by encoding and modulating the transmission bit string. In addition, when receiving data, the transceiver 1310 restores the reception bit string by demodulating and decoding the baseband signal. In addition, the transceiver 1310 up-converts the baseband signal into a radio frequency (RF) band signal and transmits it through an antenna, and down-converts the RF band signal received through the antenna into the baseband signal.

To this end, the transceiver 1310 may include a transmission filter, a reception filter, an amplifier, a mixer, an oscillator, a digital to analog convertor (DAC), an analog to digital convertor (ADC), and the like. In addition, the transceiver 1310 may include a number of transmission/reception paths. Furthermore, the transceiver 1310 may include at least one antenna array configured with a number of antenna elements. In terms of hardware, the transceiver 1310 may be configured with a digital unit and an analog unit, and the analog unit may be configured with a number of sub-units depending on operating power, operating frequency, and the like.

The transceiver 1310 transmits and receives signals as described above. Accordingly, the transceiver 1310 may be referred to as a 'transmission unit', a 'reception unit', or a 'transmission/reception unit'. In addition, in the following description, transmission and reception performed through a wireless channel, a backhaul network, an optical cable, Ethernet, and other wired paths includes meaning that performing processing as described above by the transceiver 1310. According to an embodiment, the transceiver 1310 may provide an interface for performing communication with another node. In other words, the transceiver 1310 may convert a bit string transmitted from the vehicle 210 to another node, for example, another vehicle, another RSU, an external server (e.g., a service provider server 550 or a certification authority server 560), into a physical signal, and may convert a physical signal received from the other node into a bit string.

The memory 1320 may store data such as a basic program, an application program, and setting information for the operation of the vehicle 210. The memory 1320 may store various data used by at least one component (e.g., the transceiver 1310 and the processor 1320). The data may include, for example, input data or output data for software and related commands. The memory 1320 may be configured with a volatile memory, a nonvolatile memory, or a combination of the volatile memory and the nonvolatile memory.

The processor 1330 controls the overall operations of the vehicle 210. For example, the processor 1330 writes and reads data to and from the memory 1320. For example, the processor 1330 transmits and receives signals through the transceiver 1310. And the memory 1320 may provide stored data according to the request of the processor 1330. Although one processor is illustrated in FIG. 13A, embodiments of the present disclosure are not limited thereto. The vehicle 210 may include a plurality of processors to perform embodiments of the present disclosure. The processor 1330 may be referred to as a control unit or control means. According to embodiments, the processor 1330 may control the vehicle 210 to perform at least one of operations or methods according to embodiments of the present disclosure.

Figure 13B:
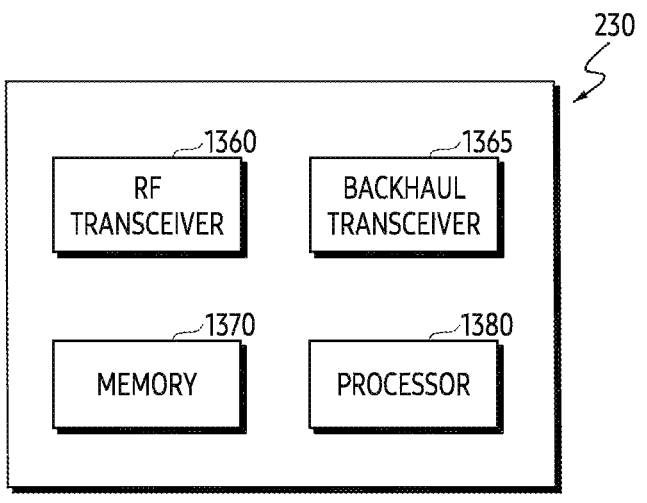
FIG. 13B illustrates an example of components of an RSU according to an embodiment.

FIG. 13B illustrates an example of components of a RSU 230 according to an embodiment. Terms such as ' . . . unit', ' . . . er' used below mean a unit that processes at least one function or operation, and may be implemented through hardware, software, or a combination of hardware and software.

Referring to FIG. 13B, the RSU 230 includes an RF transceiver 1360, a backhaul transceiver 1365, a memory 1370, and a processor 1380.

The RF transceiver 1360 performs functions for transmitting and receiving signals through the wireless channel. For example, the RF transceiver 1360 up-converts a baseband signal into an RF band signal and transmits it through an antenna, and down-converts the RF band signal received through the antenna into the baseband signal. For example, the RF transceiver 1360 may include a transmission filter, a reception filter, an amplifier, a mixer, an oscillator, a DAC, an ADC, and the like.

The RF transceiver 1360 may include a number of transmission/reception paths. Furthermore, the RF transceiver 1360 may include an antenna unit. The RF transceiver 1360 may include at least one antenna array configured with a number of antenna elements. In terms of hardware, the RF transceiver 1360 may be configured with a digital circuit and an analog circuit (e.g., radio frequency integrated circuit (RFIC)). Here, the digital circuit and analog circuit may be implemented in one package. In addition, the RF transceiver 1360 may include a number of RF chains. The RF transceiver 1360 may perform beamforming. The RF transceiver 1360 may apply a beamforming weight to the signal to be transmitted and received in order to give directionality according to the settings of the processor 1380. According to an embodiment, the RF transceiver 1360 may include a radio frequency (RF) block (or RF unit).

According to an embodiment, the RF transceiver 1360 may transmit and receive the signal on a radio access network. For example, the RF transceiver 1360 may transmit a downlink signal. The downlink signal may include a synchronization signal (SS), a reference signal (RS) (e.g., cell-specific reference signal (CRS), demodulation (DM)-RS), system information (e.g., MIB, SIB, remaining system information (RMSI), other system information (OSI)), a configuration message, control information, or downlink data, and the like. In addition, for example, the RF transceiver 1360 may receive an uplink signal. The uplink signal may include a random access-related signals (e.g., random access preamble (RAP) (or message 1 (Msg1)), message 3 (Msg3)), a reference signal (e.g., sounding reference signal (SRS), DM-RS), or power headroom report (PHR), and the like. Although only the RF transceiver 1360 is illustrated in FIG. 13B, according to another implementation example, the RSU 230 may include two or more RF transceivers.

The backhaul transceiver 1365 may transmit and receive the signal. According to an embodiment, the backhaul transceiver 1365 may transmit and receive the signal on the core network. For example, the backhaul transceiver 1365 may perform communication with an external server (e.g., a service provider server 550, a certification authority server 560) or an external device (e.g., a RSU controller 240) by connecting to the Internet through the core network. In addition, for example, the backhaul transceiver 1365 may also perform communication with another RSU. Although only the backhaul transceiver 1365 is illustrated in FIG. 13B, according to another implementation example, the RSU 230 may include two or more backhaul transceivers.

The RF transceiver 1360 and the backhaul transceiver 1365 transmit and receive the signal as described above. Accordingly, all or part of the RF transceiver 1360 and the backhaul transceiver 1365 may be referred to as a 'communication unit', a 'transmission unit', a 'reception unit', or a 'transceiver unit'. In addition, in the following description, transmission and reception performed through the wireless channel are used to mean including that the processing as described above is performed by the RF transceiver 1360.

The memory 1370 stores data such as a basic program, an application program, and setting information for the operation of the RSU 230. The memory 1370 may be referred to as a storage unit. The memory 1370 may be configured with a volatile memory, a nonvolatile memory, or a combination of the volatile memory and the nonvolatile memory. Then, the memory 1370 provides stored data according to the request of the processor 1380.

The processor 1380 controls the overall operations of the RSU 230. The processor 1380 may be referred to as a control unit. For example, the processor 1380 transmits and receives the signal through the RF transceiver 1360 or the backhaul transceiver 1365. In addition, the processor 1380 writes and reads data to and from the memory 1370. Then, the processor 1380 may perform the functions of the protocol stack required by the communication standard. Although only the processor 1380 is illustrated in FIG. 13B, according to another implementation example, the RSU 230 may include two or more processors. The processor 1380 is an instruction set or a code stored in the memory 1370, and may be instruction/code that is at least temporarily resided in the processor 1380 or a storage space where instruction/code are stored, or may be part of a circuit configuring the processor 1380. In addition, the processor 1380 may include various modules for performing communication. The processor 1380 may control the RSU 230 to perform operations according to embodiments described later.

The configuration of the RSU 230 illustrated in FIG. 13B is only an example, and the example of the RSU performing the embodiments of the present disclosure is not limited to the configuration illustrated in FIG. 13B. In some embodiments, some configurations may be added, deleted, or changed.

Figure 14:
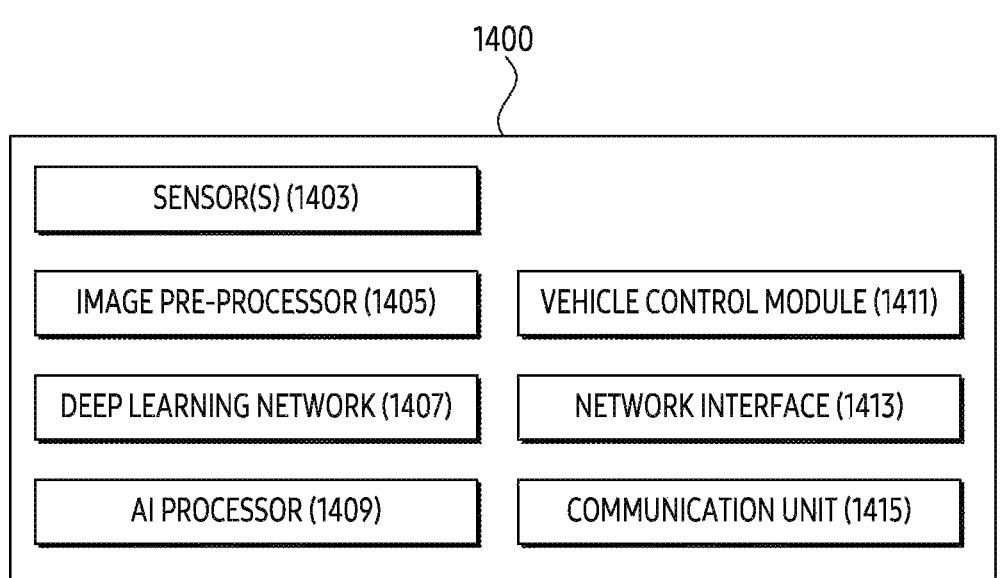
FIG. 14 is a block diagram illustrating an autonomous driving system of a vehicle.

FIG. 14 is a block diagram illustrating an autonomous driving system of a vehicle. The vehicle of FIG. 14 may be referred to the vehicle 210 of FIG. 5. The electronic devices 120 and 130 of FIG. 1 may include an autonomous driving system 1400.

The autonomous driving system 1400 of the vehicle according to FIG. 14 may be a deep learning network including sensors 1403, an Image pre-processor 1405, a deep learning network 1407, an artificial intelligence (AI) processor 1409, a Vehicle Control Module 1411, a network interface 1413, and a communication unit 1415. In various embodiments, each element may be connected through various interfaces. For example, sensor data sensed and output by the sensors 1403 may be fed to the Image pre-processor 1405. The sensor data processed by the Image pre-processor 1405 may be fed to the deep learning network 1407 running on the AI processor 1409. The output of the deep learning network 1407 running by the AI processor 1409 may be fed to the Vehicle Control Module 1411. Intermediate results of the deep learning network 1407 running on the AI processor 1409 may be fed to the AI processor 1409. In various embodiments, the network interface 1413 delivers autonomous driving route information and/or autonomous driving control commands for autonomous driving of the vehicle to the internal block configurations, by performing communication with an electronic device in the vehicle. In an embodiment, a network interface 1431 may be used to transmit sensor data obtained through the sensor(s) 1403 to an external server. In some embodiments, an autonomous driving control system 1400 may include additional or fewer components as appropriate. For example, in some embodiments, the Image pre-processor 1405 may be an optional component. For another example, a post-processing component (not illustrated) may be included within the autonomous driving control system 1400 to perform post-processing on the output of the deep learning network 1407 before the output is provided to the Vehicle Control Module 1411.

In some embodiments, the sensors 1403 may include one or more sensors. In various embodiments, the sensors 1403 may be attached to different locations of the vehicle. The sensors 1403 may face one or more different directions. For example, the sensors 1403 may be attached to the front, sides, rear, and/or roof of the vehicle to face directions such as forward-facing, rear-facing, and side-facing. In some embodiments, the sensors 1403 may be image sensors such as high dynamic range cameras. In some embodiments, the sensors 1403 include non-visual sensors. In some embodiments, the sensors 1403 include RADAR, Light Detection And Ranging (LiDAR), and/or ultrasonic sensors in addition to the image sensor. In some embodiments, the sensors 1403 are not mounted on a vehicle having Vehicle Control Module 1411. For example, the sensors 1403 may be included as part of a deep learning system for capturing the sensor data and may be attached to the environment or roadway and/or mounted on nearby vehicles.

In some embodiments, an Image pre-processor 1405 may be used to pre-process sensor data of the sensors 1403. For example, the Image pre-processor 1405 may be used to preprocess the sensor data, to split the sensor data into one or more components, and/or to post-process one or more components. In some embodiments, the Image pre-processor 1405 may be a graphics processing unit (GPU), a central processing unit (CPU), an image signal processor, or a specialized image processor. In various embodiments, the Image pre-processor 1405 may be a tone-mapper processor for processing high dynamic range data. In some embodiments, the Image pre-processor 1405 may be a component of the AI processor 1409.

In some embodiments, the Deep learning network 1407 may be a deep learning network for implementing control commands for controlling an autonomous vehicle. For example, the Deep learning network 1407 may be an artificial neural network such as a convolution neural network (CNN) trained by using the sensor data, and the output of the Deep learning network 1407 is provided to the Vehicle Control Module 1411.

In some embodiments, the artificial intelligence (AI) processor 1409 may be a hardware processor for running the Deep learning network 1407. In some embodiments, the AI processor 1409 is a specialized AI processor for performing inference on the sensor data through the convolution neural network (CNN). In some embodiments, the AI processor 1409 may be optimized for bit depth of the sensor data. In some embodiments, the AI processor 1409 may be optimized for deep learning operations, such as operations of a neural network including convolution, dot product, vector and/or matrix operations. In some embodiments, the AI processor 1409 may be implemented through a plurality of graphic processing devices (GPUs) capable of effectively performing parallel processing.

In various embodiments, the AI processor 1409 may be coupled through an input/output interface to a memory configured to provide an AI processor having instructions that trigger to perform a deep learning analysis on the sensor data received from the sensor(s) 1403 and determine machine learning results used to at least partially operate the vehicle autonomously while the AI processor 1409 is running. In some embodiments, the Vehicle Control Module 1411 may be used to process commands for vehicle control outputted from the artificial intelligence (AI) processor 1409 and translate the output of the AI processor 1409 into instructions for controlling modules of each vehicle to control various modules of the vehicle. In some embodiments, the Vehicle Control Module 1411 is used to control a vehicle for autonomous driving. In some embodiments, the Vehicle Control Module 1411 may adjust the steering and/or speed of the vehicle. For example, the Vehicle Control Module 1411 may be used to control the driving of the vehicle such as deceleration, acceleration, steering, lane change, lane keeping, and the like. In some embodiments, the Vehicle Control Module 1411 may generate control signals for controlling vehicle lighting, such as brake lights, turns signals, headlights, and the like. In some embodiments, the Vehicle Control Module 1411 may be used to control vehicle audio-related systems such as a vehicle's sound system, vehicle's audio warnings, a vehicle's microphone system, a vehicle's horn system, and the like.

In some embodiments, the Vehicle Control Module 1411 may be used to control notification systems, including warning systems to notify passengers and/or drivers of driving events, such as approach of the intended destination or potential collision. In some embodiments, the Vehicle Control Module 1411 may be used to adjust sensors, such as the sensors 1403 of the vehicle. For example, the Vehicle Control Module 1411 may modify the orientation of the sensors 1403, change the output resolution and/or format type of the sensors 1403, increase or decrease the capture rate, adjust the dynamic range, and adjust the focus of the camera. In addition, the Vehicle Control Module 1411 may turn on/off the operation of sensors individually or collectively. In some embodiments, the Vehicle Control Module 1411 may be used to change the parameters of the Image pre-processor 1405 in a method such as modifying the frequency range of filters, adjusting features and/or edge detection parameters for object detection, or adjusting channels and bit depth, and the like. In various embodiments, the Vehicle Control Module 1411 may be used to control autonomous driving of the vehicle and/or Driver assistance functions of the vehicle.

In some embodiments, the network interface 1413 may be responsible for an internal interface between the block components of the autonomous driving control system 1400 and the communication unit 1415. Specifically, the network interface 1413 may be a communication interface for receiving and/or sending data including voice data. According to various embodiments, the network interface 1413 may be connected to external servers to connect voice calls, receive and/or transmit text messages, transmit sensor data, update the software of the vehicle to the autonomous driving system, or update the software of the autonomous driving system of the vehicle, through the communication unit 1415.

In various embodiments, the communication unit 1415 may include various wireless interfaces of cellular or WiFi methods. For example, the network interface 1413 may be used to receive an update on operating parameters and/or instructions for the sensors 1403, the Image pre-processor 1405, the Deep learning network 1407, the AI processor 1409, and the Vehicle Control Module 1411 from the external server connected through the communication unit 1415. For example, the machine learning model of the Deep learning network 1407 may be updated by using the communication unit 1415. According to another example, the communication unit 1415 may be used to update the operating parameters of the Image pre-processor 1405, such as image processing parameters, and/or the firmware of the sensors 1403.

In another embodiment, the communication unit 1415 may be used to activate communications for emergency contact with emergency services in an accident or near-accident event. For example, in a crash event, the communication unit 1415 may be used to call emergency services for assistance and may be used to externally notify emergency services of the crash details and the location of the vehicle. In various embodiments, the communication unit 1415 may update or obtain the expected arrival time and/or destination location.

According to an embodiment, the autonomous driving system 1400 illustrated in FIG. 14 may be configured with an electronic device of the vehicle. According to an embodiment, when an autonomous driving release event occurs from a user during autonomous driving of the vehicle, the AI processor 1409 of the autonomous driving system 1400 may control the vehicle's autonomous driving software to learn by controlling information related to the autonomous driving release event to be inputted as training set data of the deep learning network.

The Vehicle Control Module 1411 according to the present embodiment may generate various vehicle operation information to prevent secondary accidents such as Collision avoidance, Collision mitigation, Lane changing, accelerating, braking, steering wheel control, and the like according to message elements included in the received event message.

Figure 15:
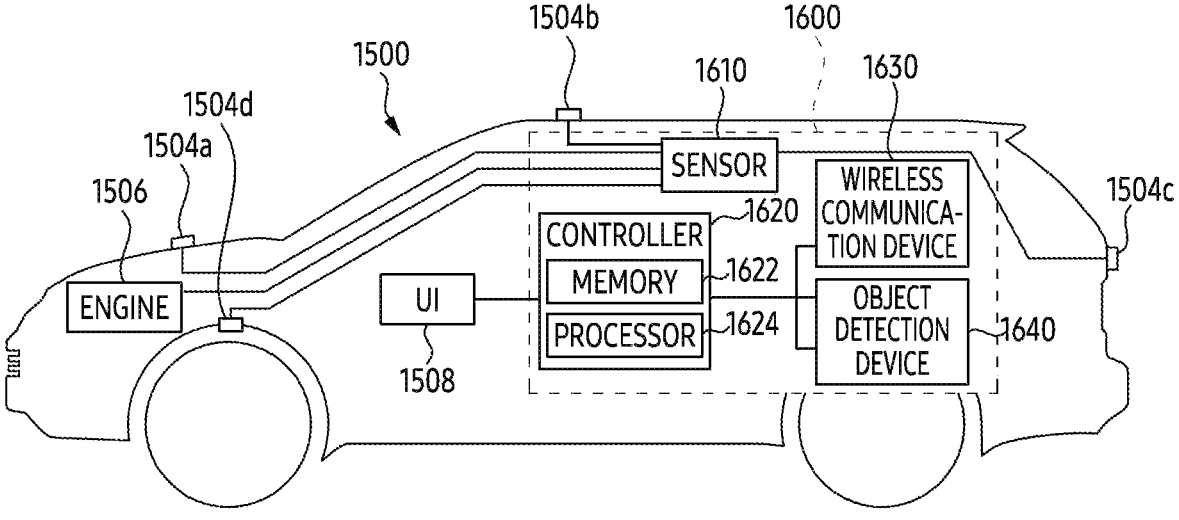
FIGS. 15 and 16 are block diagrams illustrating an autonomous driving vehicle according to an embodiment.
Figure 16:
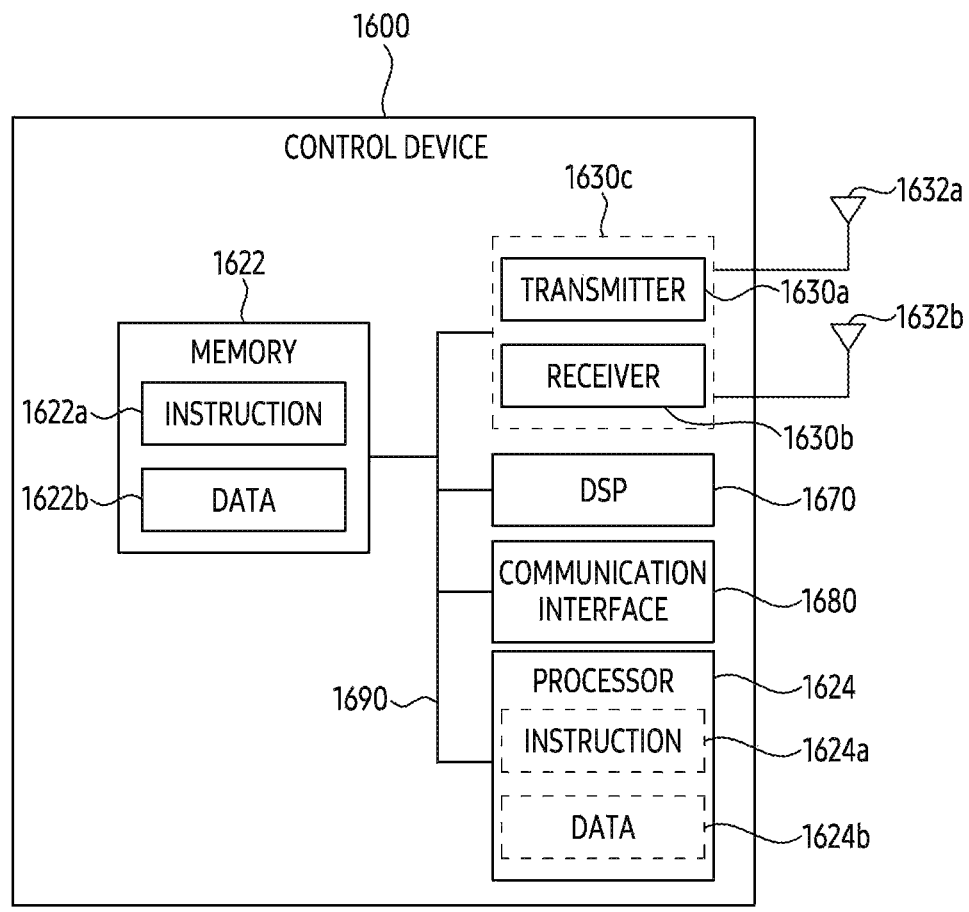

FIGS. 15 and 16 are block diagrams illustrating an autonomous driving vehicle according to an embodiment. Referring to FIG. 15, an autonomous driving vehicle 1500 according to the present embodiment may include a control device 1600, sensing modules 1504*a*, 1504*b*, 1504*c*, and 1504*d*, an engine 1506, and a user interface 1508. For example, the autonomous driving vehicle 1500 may be an example of the vehicles 211, 212, 213, 215, and 217 of FIG. 2. For example, the autonomous driving vehicle 1500 may be controlled by the electronic devices 120 and 130.

The autonomous driving vehicle 1500 may have an autonomous driving mode or a manual mode. For example, according to the user input received through the user interface 1508, it may be switched from the manual mode to the autonomous driving mode or may be switched from the autonomous driving mode to the manual mode.

In case that the vehicle 1500 operates in the autonomous driving mode, the autonomous driving vehicle 1500 may operate under the control of the control device 1600.

In the present embodiment, the control device 1600 may include a controller 1620, including a memory 1622 and a processor 1624, a sensor 1610, a wireless communication device 1630, and an object detection device 1640.

Here, the object detection device 1640 may perform all or part of the function of the distance measurement device (e.g., the electronic devices 120 and 130).

In other words, in the present embodiment, the object detection device 1640 is a device for detecting an object located outside the vehicle 1500, and the object detection device 1640 may detect an object located outside the vehicle 1500 and may generate object information according to the detection result.

The object information may include information on existence or nonexistence of the object, location information of the object, distance information between the vehicle and the object, and relative speed information between the vehicle and the object.

The object may include various objects located outside the vehicle 1500, such as a lane, another vehicle, a pedestrian, a traffic signal, light, a road, a structure, a speed bump, a landform, an animal, and the like. Here, the traffic signal may be a concept including a traffic signal, a traffic sign, a pattern or text drawn on a road surface. In addition, light may be light generated from a lamp provided in another vehicle, light generated from a streetlamp, or sunlight.

In addition, the structure may be an object located around the road and fixed to the ground. For example, the structure may include the streetlamp, a street tree, a building, a power pole, a traffic light, and a bridge. The landform may include a mountain, a hill, and the like.

The object detection device 1640 may include a camera module. The controller 1620 may extract object information from an external image photographed by the camera module and allow the controller 1620 to process information thereon.

In addition, the object detection device 1640 may further include imaging devices for recognizing an external environment. In addition to LIDAR, RADAR, a GPS device, Odometry, and other computer vision devices, an ultrasonic sensor, and an infrared sensor may be used, which may be selected or operated simultaneously as needed to enable more precise detection.

Meanwhile, the distance measurement device according to an embodiment of the present invention may calculate a distance between the autonomous driving vehicle 1500 and the object and may control the operation of the vehicle based on the distance calculated in connection with the control device 1600 of the autonomous driving vehicle 1500.

For example, in case that there is a possibility of a collision depending on the distance between the autonomous driving vehicle 1500 and the object, the autonomous driving vehicle 1500 may control the brake to lower or stop the speed. For another example, in case that the object is a moving object, the autonomous driving vehicle 1500 may control the driving speed of the autonomous driving vehicle 1500 to maintain a predetermined distance or more from the object.

The distance measurement device according to an embodiment of the present invention may be configured as a module in the control device 1600 of the autonomous driving vehicle 1500. In other words, the memory 1622 and the processor 1624 of the control device 1600 may be configured to implement the collision prevention method according to the present invention in software.

In addition, the sensor 1610 may obtain various sensing information by connecting the internal/external environment of the vehicle with the sensing modules 1504a, 1504b, 1504c, and 1504d. Here, the sensor 1610 may include a posture sensor (e.g., a yaw sensor), a roll sensor, a pitch sensor, a collision sensor, a wheel sensor, a speed sensor, a tilt sensor, a weight detection sensor, a heading sensor, a gyro sensor, a position module, a vehicle forward/rearward sensor, a battery sensor, a fuel sensor, a tire sensor, a steering sensor by handle rotation, a vehicle internal temperature sensor, a vehicle internal humidity sensor, an ultrasonic sensor, an illumination sensor, an accelerator pedal position sensor, a brake pedal position sensor, and the like.

Accordingly, the sensor 1610 may obtain sensing signals for vehicle posture information, vehicle collision information, vehicle direction information, vehicle location information (GPS information), vehicle angle information, and vehicle speed information, vehicle acceleration information, vehicle tilt information, vehicle forward/rearward information, battery information, fuel information, tire information, vehicle lamp information, and vehicle internal temperature information, vehicle internal humidity information, a steering wheel rotation angle, vehicle external illumination, pressure applied to the accelerator pedal, pressure applied to the brake pedal, and the like.

In addition, the sensor 1610 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, a crank angle sensor (CAS), and the like.

As described above, the sensor 1610 may generate vehicle state information based on sensing data.

A wireless communication device 1630 is configured to implement wireless communication between the autonomous driving vehicles 1500. For example, the wireless communication device 1630 allow the autonomous driving vehicle 1500 to communicate with the user's mobile phone, or another wireless communication device 1630, another vehicle, a central device (a traffic control device), a server, and the like. The wireless communication device 1630 may transmit and receive wireless signals according to an access wireless protocol. Wireless communication protocols may be Wi-Fi, Bluetooth, Long-Term Evolution (LTE), Code Division Multiple Access (CDMA), Wideband Code Division Multiple Access (WCDMA), Global Systems for Mobile Communications (GSM), but communication protocols are not limited thereto.

In addition, in the present embodiment, it is also possible for the autonomous driving vehicle 1500 to implement communication between the vehicles through the wireless communication device 1630. In other words, the wireless communication device 1630 may perform communication with other vehicles and other vehicles on the road through vehicle-to-vehicle (V2V) communication. The autonomous driving vehicle 1500 may transmit and receive information such as driving warning and traffic information through the vehicle-to-vehicle (V2V) communication, and it is also possible to request information from or receive requests from another vehicle. For example, the wireless communication device 1630 may perform V2V communication as a dedicated short-range communication (DSRC) device or a Cellular-V2V (C-V2V) device. In addition, in addition to the vehicle-to-vehicle (V2V) communication, communication (e.g., Vehicle to Everything communication (V2X,)) between vehicles and other objects (for example, electronic devices carried by pedestrians, and the like) may also be implemented through the wireless communication device 1630.

In this embodiment, the controller 1620 is a unit that controls the overall operation of each unit in the vehicle 1500, and may be configured by the manufacturer of the vehicle at the time of manufacture or may be additionally configured to perform the function of autonomous driving after manufacture. Alternatively, a configuration for continuously performing additional functions may be included through an upgrade of the controller 1620 configured at the time of manufacture. This controller 1620 may also be called an Electronic Control Unit (ECU).

The controller 1620 may collect various data from the connected sensor 1610, the object detection device 1640, the communication device 1630, and may deliver a control signal to the sensor 1610, the engine 1506, the user interface 1508, the communication device 1630, and the object detection device 1640 included in other components in the vehicle based on the collected data. In addition, although not illustrated, the control signal may also be delivered to an acceleration device, a braking system, a steering device, or a navigation device related to the driving of the vehicle.

In the present embodiment, the controller 1620 may control the engine 1506, for example, may detects a speed limit of a road on which the autonomous driving vehicle 1500 is driving, and may control the engine 1506 so that the driving speed does not exceed the speed limit or may control the engine 1506 to accelerate the driving speed of the autonomous driving vehicle 1500 within a range that does not exceed the speed limit.

In addition, if the autonomous driving vehicle 1500 approaches or deviates from the lane during driving of the autonomous driving vehicle 1500, the controller 1620 determines whether such lane approaching and deviating are due to a normal driving situation or other driving situations, and may control the engine 1506 to control the driving of the vehicle according to the determination result. Specifically, the autonomous driving vehicle 1500 may detect lanes formed on both sides of a lane on which the vehicle is driving. In this case, the controller 1620 may determine whether the autonomous driving vehicle 1500 approaches or deviates from the lane, and if it is determined that the autonomous driving vehicle 1500 approaches or deviates from the lane, the controller 1620 may determine whether this driving is according to an accurate driving situation or other driving situations. Here, as an example of the normal driving situation, it may be a situation in which a lane change of the vehicle is required. In addition, as an example of other driving situations, it may be a situation in which a lane change of the vehicle is not required. If it is determined that the autonomous driving vehicle 1500 is approaching the lane or deviating from the lane in a situation in which the vehicle does not need to change lane, the controller 1620 may control the driving of autonomous driving vehicle 1500 so that the autonomous driving vehicle 1500 does not deviate from the lane and normally drives in the corresponding vehicle.

In case that another vehicle or obstacle exists in front of the vehicle, the controller 1620 may control the engine 1606 or the braking system to decelerate the driving vehicle, and may control the trajectory, driving path, and steering angle in addition to the speed. Alternatively, the controller 1620 may control the driving of the vehicle by generating necessary control signals according to recognition information of the external environment, such as the driving lane of the vehicle and driving signals.

In addition to generating its own control signal, the controller 1620 may also control the driving of the vehicle by performing communication with a nearby vehicle or a central server and transmitting commands to control peripheral devices through received information.

In addition, in case that the location of the camera module 1650 changes or the angle of view changes, since accurate recognition of the vehicle or lane according to the present embodiment may be difficult, to prevent this, the controller 1620 may generate a control signal for controlling to perform calibration on the camera module 1650. Thus, in the present embodiment, by generating a calibration control signal to the camera module 1650, the controller 1220 may continuously maintain the normal mounting location, direction, angle of view, and the like of the camera module 1650 even if the mounting location of the camera module 1650 is changed due to vibration or impact generated by the movement of the autonomous driving vehicle 1500. In case that the initial mounting location, direction, and angle of view information of the pre-stored camera module 1620 and the initial mounting location, direction, angle of view information, and the like of the camera module 1620 measured during driving of the autonomous driving vehicle 1500 are changed by a threshold value or more, the controller 1620 may generate the control signal to perform the calibration of the camera module 1620.

In the present embodiment, the controller 1620 may include the memory 1622 and the processor 1624. The processor 1624 may execute software stored in the memory 1622 according to the control signal of the controller 1620. Specifically, the controller 1620 stores data and commands for performing the lane detection method according to the present invention in the memory 1622, and the commands may be executed by the processor 1624 to implement one or more methods disclosed herein.

In this case, the memory 1622 may be stored in a recording medium executable by the non-volatile processor 1624. The memory 1622 may store software and data through an appropriate internal external device. The memory 1622 may be configured with a random access memory (RAM), a read only memory (ROM), a hard disk, and a memory 1622 device connected to the dongle.

The memory 1622 may store an Operating system (OS), a user application, and executable commands at least. The memory 1622 may also store application data and array data structures.

The processor 1624 may be a microprocessor or suitable electronic processor, which may be a controller, microcontroller, or state machine.

The processor 1624 may be implemented as a combination of computing devices, and the computing device may be configured with a digital signal processor, a microprocessor, or an appropriate combination thereof.

Meanwhile, the autonomous driving vehicle 1500 may further include the user interface 1508 for user input to the above-described control device 1600. The user interface 1508 may allow the user to input information through appropriate interaction. For example, the user interface 1508 may be implemented as a touch screen, a keypad, or an operation button. The user interface 1508 may transmit an input or a command to the controller 1620, and the controller 1620 may perform a control operation of the vehicle in response to the input or the command.

In addition, the user interface 1508 is a device outside the autonomous driving vehicle 1500 and may perform communication with the autonomous driving vehicle 1500 through the wireless communication device 1630. For example, the user interface 1508 may be interworkable with a mobile phone, tablet, or other computer device.

Furthermore, in the present embodiment, the autonomous driving vehicle 1500 has been described as including the engine 1506, but it may also include other types of propulsion systems. For example, the vehicle may be operated with electrical energy, and may be operated through hydrogen energy or a hybrid system combining them. Thus, the controller 1620 may include a propulsion mechanism according to the propulsion system of the autonomous driving vehicle 1500 and may provide a control signal according to this to the components of each propulsion mechanism.

Hereinafter, a detailed configuration of the control device 1600 according to the present invention according to the present embodiment will be described in more detail with reference to FIG. 16.

The control device 1600 includes a processor 1624. The processor 1624 may be a general-purpose single or multi-chip microprocessor, a dedicated microprocessor, a microcontroller, a programmable gate array, and the like. The processor may be referred to as a central processing unit (CPU). In addition, in the present embodiment, the processor 1624 may be used as a combination of a plurality of processors.

The control device 1600 also includes the memory 1622. The memory 1622 may be any electronic component capable of storing electronic information. The memory 1622 may also include a combination of memories 1622 in addition to a single memory.

Data and instructions 1622*a* for performing the distance measuring method of the distance measuring device according to the present invention may be stored in the memory 1622. When the processor 1624 executes the instructions 1622*a*, all or part of the instructions 1622*a* and the data 1622*b* required for performing the command may be loaded 1624*a* and 1624*b* onto the processor 1624.

The control device 1600 may include a transmitter 1630*a*, a receiver 1630*b*, or a transceiver 1630*c* for allowing transmission and reception of signals. One or more antennas 1632*a* and 1632*b* may be electrically connected to the transmitter 1630*a*, the receiver 1630*b*, or each transceiver 1630*c*, and may include additional antennas.

The control device 1600 may include a digital signal processor (DSP) 1670. The control device 1600 may enable the vehicle to rapidly process the digital signal through the DSP 1670.

The control device 1600 may include a communication interface 1680. The communication interface 1680 may include one or more ports and/or communication modules for connecting other devices to the control device 1600. The communication interface 1680 may allow the user and the control device 1600 to interact with each other.

The various components of control device 1600 may be connected together by one or more buses 1690, the buses 1690 may include a power bus, control signal bus, state signal bus, data bus, and the like. Under the control of the processor 1624, components may transmit mutual information through the bus 1690 and perform a desired function.

In embodiments, the processor 1624 of the control device 1600 may control to perform communication with other vehicles and/or RSUs through the communication interface 1680. In case that the vehicle equipped with the control device 1600 is a source vehicle, the processor 1624 may read event-related information stored in the memory 1622 and include it in an element of the event message, and then encrypt the event message according to a predetermined encryption method. The processor 1624 may transmit the encrypted message to other vehicles and/or RSUs through the communication interface 1680.

In addition, in embodiments, in case that the processor 1624 of the control device 1600 receives the event message through the communication interface 1680, it may decrypt the event message by using the decryption-related information stored in the memory 1622. After the decryption, the processor 1624 of the control device 1600 may determine whether the vehicle is a dependent vehicle dependent on the event message. If the vehicle corresponds to the dependent vehicle, the processor 1624 of the control device 1600 may control the vehicle to perform autonomous driving according to the element included in the event message.

In embodiments, a device of a vehicle may comprise at least one transceiver, memory configured to store instructions, and at least one processor operably coupled to the memory and the at least one transceiver. The at least one processor may be, when the instructions are executed, configured to receive an event message related to an event of a source vehicle. The event message may include identification information on a serving road side unit (RSU) of the source vehicle and direction information indicating a driving direction of the source vehicle. The at least one processor may be, when the instructions are executed, configured to identify whether the serving RSU of the source vehicle is included in a driving list of the vehicle. The at least one processor may be, when the instructions are executed, configured to identify whether the driving direction of the source vehicle matches a driving direction of the vehicle. The at least one processor may be, when the instructions are executed, configured to, upon identifying that the driving direction of the source vehicle matches the driving direction of the vehicle and the serving RSU of the source vehicle is included in the driving list of the vehicle, perform driving according to the event message. The at least one processor may be, when the instructions are executed, configured to, upon identifying that the driving direction of the source vehicle does not match the driving direction of the vehicle or the serving RSU of the source vehicle is not included in the driving list of the vehicle, perform driving without the event message.

According to an embodiment, the driving list of the vehicle may include identification information for one or more RSUs. The driving direction may indicate one of a first lane direction and a second lane direction opposite to the first lane direction.

According to an embodiment, the at least one processor may be, when the instructions are executed, configured to identify encryption information for the serving RSU based on receiving the event message. The at least one processor may be, when the instructions are executed, configured to obtain the identification information for the serving RSU of the source vehicle and the direction information indicating the driving direction of the source vehicle by decrypting the event message based on the encryption information for the serving RSU.

According to an embodiment, the at least one processor may be, when the instructions are executed, configured to transmit a service request message to a service provider server through a RSU before receiving the event message. The at least one processor may be, when the instructions are executed, configured to receive a service response message corresponding to the service request message from the service provider server through the RSU. The service response message may include driving plan information for indicating an expected driving path of the vehicle, information on one or more RSUs related to the expected driving path, and encryption information for each of the one or more RSUs. The encryption information may include encryption information for the serving RSU.

According to an embodiment, the at least one processor may be, when the instructions are executed, configured to receive a broadcast message from the serving RSU before receiving the event message. The broadcast message may include identification information for the RSU, information for indicating at least one RSU adjacent to the RSU, and encryption information for the RSU.

According to an embodiment, the at least one processor may be, when the instructions are executed to perform the driving according to the event message, configured to change driving-related setting of the vehicle based on the event message. The driving-related setting may include at least one of a driving path of the vehicle, a driving lane of the vehicle, a driving speed of the vehicle, a lane of the vehicle, or braking of the vehicle.

According to an embodiment, the at least one processor may be, when the instructions are executed to perform the driving according to the event message, configured to generate a delivery event message based on the event message. The at least one processor may be, when the instructions are executed to perform the driving according to the event message, configured to encrypt the delivery event message based on encryption information on a RSU servicing the vehicle. The at least one processor may be, when the instructions are executed to perform the driving according to the event message, configured to transmit the encrypted delivery event message to the RSU or to another vehicle.

According to an embodiment, the at least one processor may be, when the instructions are executed to perform the driving according to the event message, configured to transmit an update request message to a service provider server through a RSU servicing the vehicle. The at least one processor may be, when the instructions are executed to perform the driving according to the event message, configured to receive an update message from the service provider server through the RSU. The update request message may include information related to the event of the source vehicle. The update message may include information for indicating an updated driving path of the vehicle.

In embodiments, a device performed by a road side unit (RSU), the device may comprise at least one transceiver, memory configured to store instructions, and at least one processor operably coupled to the memory and the at least one transceiver. The at least one processor may be, when the instructions are executed, configured to receive an event message related to an event in the vehicle from a vehicle serviced by the RSU. The event message may include identification information of the vehicle and direction information indicating a driving direction of the vehicle. The at least one processor may be, when the instructions are executed, configured to identify a driving path of the vehicle based on the identification information of the vehicle. The at least one processor may be, when the instructions are executed, configured to identify at least one RSU located in a direction opposite to the driving direction of the vehicle from the RSU among one or more RSUs included in the driving path of the vehicle. The at least one processor may be, when the instructions are executed, configured to transmit the event message to each of the identified at least one RSU.

According to an embodiment, the at least one processor may be, when the instructions are executed, configured to generate a delivery event message based on the event message. The at least one processor may be, when the instructions are executed, configured to encrypt the delivery event message based on encryption information for the RSU, and the at least one processor may be, when the instructions are executed, configured to transmit the encrypted delivery event message to another vehicle within the RSU. The encryption information for the RSU may be broadcast from the RSU.

In embodiments, a method performed by a vehicle, the method may comprise receiving an event message related to an event of a source vehicle. The event message may include identification information on a serving road side unit (RSU) of the source vehicle and direction information indicating a driving direction of the source vehicle. The method may include identifying whether the serving RSU of the source vehicle is included in a driving list of the vehicle. The method may include identifying whether the driving direction of the source vehicle matches a driving direction of the vehicle. The method may include, upon identifying that the driving direction of the source vehicle matches the driving direction of the vehicle and the serving RSU of the source vehicle is included in the driving list of the vehicle, performing driving according to the event message. The method may include, upon identifying that the driving direction of the source vehicle does not match the driving direction of the vehicle or the serving RSU of the source vehicle is not included in the driving list of the vehicle, performing driving without the event message.

According to an embodiment, the driving list of the vehicle includes identification information for one or more RSUs. The driving direction may indicate one of a first lane direction and a second lane direction opposite to the first lane direction.

According to an embodiment, the method may comprise identifying encryption information for the serving RSU based on receiving the event message. The method may comprise obtaining the identification information for the serving RSU of the source vehicle and the direction information indicating the driving direction of the source vehicle by decrypting the event message based on the encryption information for the serving RSU.

According to an embodiment, the method may comprise transmitting a service request message to a service provider server through a RSU before receiving the event message. The method may comprise receiving a service response message corresponding to the service request message from the service provider server through the RSU. The service response message may include driving plan information for indicating an expected driving path of the vehicle, information on one or more RSUs related to the expected driving path, and encryption information for each of the one or more RSUs. The encryption information may include encryption information for the serving RSU.

According to an embodiment, the method may comprise receiving a broadcast message from the serving RSU before receiving the event message. The broadcast message may include identification information for the RSU, information for indicating at least one RSU adjacent to the RSU, and encryption information for the RSU.

According to an embodiment, the performing of the driving according to the event message may comprise changing driving-related setting of the vehicle based on the event message. The driving-related setting may include at least one of a driving path of the vehicle, a driving lane of the vehicle, a driving speed of the vehicle, a lane of the vehicle, or braking of the vehicle.

According to an embodiment, the performing of the driving according to the event message may comprise generating a delivery event message based on the event message. The performing of the driving according to the event message may comprise encrypting the delivery event message based on encryption information on a RSU servicing the vehicle. The performing of the driving according to the event message may comprise transmitting the encrypted delivery event message to the RSU or to another vehicle.

According to an embodiment, the performing of the driving according to the event message may comprise transmitting an update request message to a service provider server through a RSU servicing the vehicle. The performing of the driving according to the event message may comprise receiving an update message from the service provider server through the RSU. The update request message may include information related to the event of the source vehicle. The update message may include information for indicating an updated driving path of the vehicle.

In embodiments, a method performed by a road side unit (RSU), may comprise receiving an event message related to an event in the vehicle from a vehicle serviced by the RSU. The event message may include identification information of the vehicle and direction information indicating a driving direction of the vehicle. The method may comprise identifying a driving path of the vehicle based on the identification information of the vehicle. The method may comprise identifying at least one RSU located in a direction opposite to the driving direction of the vehicle from the RSU among one or more RSUs included in the driving path of the vehicle. The method may comprise transmitting the event message to each of the identified at least one RSU.

According to an embodiment, the method may comprise generating a delivery event message based on the event message. The method may comprise encrypting the delivery event message based on encryption information for the RSU. The method may comprise transmitting the encrypted delivery event message to another vehicle within the RSU. The encryption information for the RSU may be broadcast from the RSU.

Methods according to the embodiments described in the claims or the specification of the present disclosure may be implemented in the form of hardware, software, or a combination of hardware and software.

When implemented as software, a computer-readable storage medium storing one or more program (software module) may be provided. The one or more program stored in the computer-readable storage medium is configured for execution by one or more processor in the electronic device. The one or more program include instructions that cause the electronic device to execute methods according to embodiments described in the claim or the specification of the present disclosure.

Such program (software modules, software) may be stored in random access memory, non-volatile memory including flash memory, read only memory (ROM), electrically erasable programmable read only memory (EE-PROM), magnetic disc storage device, compact disc-ROM (CD-ROM), digital versatile disc (DVD) or other form of optical storage, magnetic cassette. Alternatively, it may be stored in a memory configured with some or all combinations thereof. In addition, each configuration memory may be included a plurality.

In addition, the program may be stored in an attachable storage device that may be accessed through a communication network, such as the Internet, Intranet, local area network (LAN), wide area network (WAN), or storage area network (SAN), or a combination thereof. Such a storage device may be connected to a device performing an embodiment of the present disclosure through an external port. In addition, a separate storage device on the communication network may access a device performing an embodiment of the present disclosure.

In the above-described specific embodiments of the present disclosure, the component included in the disclosure is expressed in singular or plural according to the presented specific embodiment. However, singular or plural expression is chosen appropriately for the situation presented for convenience of explanation, and the present disclosure is not limited to singular or plural component, and even if the component is expressed in plural, it may be configured with singular, or even if it is expressed in singular, it may be configured with plural.

Meanwhile, in the detailed description of the present disclosure, the specific embodiment have been described, but it goes without saying that various modification is possible within the limit not departing from the scope of the present disclosure.

The invention claimed is:

1. A device of a vehicle, the device comprising:
at least one transceiver;
memory configured to store instructions; and
at least one processor operably coupled to the memory and the at least one transceiver, wherein the at least one processor is, when the instructions are executed, configured to:
obtain an expected driving path and a driving list of the vehicle including a plurality of road side units (RSUs) along with the expected driving path; and
receive, from a source vehicle, an event message related to an event of the source vehicle, wherein the event message includes identification information on a serving RSU of the source vehicle and direction information indicating a driving direction of the source vehicle,
identify whether the serving RSU of the source vehicle is included in the plurality of RSUs of the driving list of the vehicle,
identify whether the driving direction of the source vehicle matches a driving direction of the vehicle,
upon identifying that the driving direction of the source vehicle matches the driving direction of the vehicle and the serving RSU of the source vehicle is included in the plurality of RSUs of the driving list of the vehicle, perform driving according to the event message, and
upon identifying that the driving direction of the source vehicle does not match the driving direction of the vehicle or the serving RSU of the source vehicle is not included in the plurality of RSUs of the driving list of the vehicle, perform driving without the event message.

2. The device of claim 1,
wherein the driving direction indicates one of a first lane direction and a second lane direction opposite to the first lane direction.

3. The device of claim 1, wherein the at least one processor is, when the instructions are executed to receive the event message, further configured to:
obtain pre-encryption information including encryption information for each RSU included in the plurality of RSUs of the driving list of the vehicle; and
decrypt the event message of the source vehicle based on encryption information for the serving RSU included in the pre-encryption information, to obtain the identification information for the serving RSU of the source vehicle and the direction information.

4. The device of claim 3, wherein the at least one processor is, when the instructions are executed, further configured to:

transmit a service request message to a service provider server through a RSU before receiving the event message, and receive a service response message corresponding to the service request message from the service provider server through the RSU, and wherein the service response message includes driving plan information for indicating the expected driving path of the vehicle, the driving list of the vehicle, and the pre-encryption information.

5. The device of claim 1, wherein the at least one processor is, when the instructions are executed, further configured to receive a broadcast message from the serving RSU before receiving the event message of the source vehicle, and wherein the broadcast message includes identification information for the serving RSU and encryption information for the serving RSU.

6. The device of claim 1, wherein the at least one processor is, when the instructions are executed to perform the driving according to the event message, configured to change driving-related setting of the vehicle based on the event message, and wherein the driving-related setting includes at least one of a driving path of the vehicle, a driving lane of the vehicle, a driving speed of the vehicle, a lane of the vehicle, or braking of the vehicle.

7. The device of claim 1, wherein the at least one processor is, when the instructions are executed to perform the driving according to the event message, configured to:

generate a delivery event message based on the event message, encrypt the delivery event message based on encryption information on a RSU servicing the vehicle, and transmit the encrypted delivery event message to the RSU or to another vehicle.

8. The device of claim 1, wherein the at least one processor is, when the instructions are executed to perform the driving according to the event message, configured to:

transmit an update request message to a service provider server through a RSU servicing the vehicle, and receive an update message from the service provider server through the RSU, wherein the update request message includes information related to the event of the source vehicle, and wherein the update message includes information indicating an updated driving path of the vehicle.

9. A method performed by a vehicle, the method comprising:

obtaining an expected driving path and a driving list of the vehicle including a plurality of road side units (RSUs) along with the expected driving path; and receiving, from a source vehicle, an event message related to an event of the source vehicle, wherein the event message includes identification information on a serving RSU of the source vehicle and direction information indicating a driving direction of the source vehicle;

identifying whether the serving RSU of the source vehicle is included in the plurality of RSUs of the driving list of the vehicle;

identifying whether the driving direction of the source vehicle matches a driving direction of the vehicle;

upon identifying that the driving direction of the source vehicle matches the driving direction of the vehicle and the serving RSU of the source vehicle is included in the plurality of RSUs of the driving list of the vehicle, performing driving according to the event message, and upon identifying that the driving direction of the source vehicle does not match the driving direction of the vehicle or the serving RSU of the source vehicle is not included in the plurality of RSUs of the driving list of the vehicle, performing driving without the event message.

10. The method of claim 9, wherein the driving direction indicates one of a first lane direction and a second lane direction opposite to the first lane direction.

11. The method of claim 9, wherein the receiving the event message comprises:

obtaining pre-encryption information including encryption information for each RSU included in the plurality of RSUs of the driving list of the vehicle; and decrypting the event message of the source vehicle based on the encryption information for the serving RSU included in the pre-encryption information, to obtain the identification information for the serving RSU of the source vehicle and the direction information.

12. The method of claim 11, further comprising:

transmitting a service request message to a service provider server through a RSU before receiving the event message, and receiving a service response message corresponding to the service request message from the service provider server through the RSU, wherein the service response message includes driving plan information for indicating the expected driving path of the vehicle, the driving list of the vehicle, and the pre-encryption information.

13. The method of claim 9, further comprising:

receiving a broadcast message from the serving RSU before receiving the event message of the source vehicle, and wherein the broadcast message includes identification information for the serving RSU and encryption information for the serving RSU.

14. The method of claim 9, wherein the performing of the driving according to the event message comprises:

changing driving-related setting of the vehicle based on the event message, and wherein the driving-related setting includes at least one of a driving path of the vehicle, a driving lane of the vehicle, a driving speed of the vehicle, a lane of the vehicle, or braking of the vehicle.

15. The method of claim 9, wherein the performing of the driving according to the event message comprises:

generating a delivery event message based on the event message, encrypting the delivery event message based on encryption information on a RSU servicing the vehicle, and transmitting the encrypted delivery event message to the RSU or to another vehicle.

16. The method of claim 9, wherein the performing of the driving according to the event message comprises:

transmitting an update request message to a service provider server through a RSU servicing the vehicle, and receiving an update message from the service provider server through the RSU, wherein the update request message includes information related to the event of the source vehicle, and wherein the update message includes information indicating an updated driving path of the vehicle.

\* \* \* \* \*